United States Patent
Rico Alvarino et al.

(10) Patent No.: US 10,009,920 B2
(45) Date of Patent: Jun. 26, 2018

(54) TRIGGERING A GROUP ACKNOWLEDGEMENT/NEGATIVE ACKNOWLEDGEMENT OR CHANNEL STATE INFORMATION

(71) Applicant: QUALCOMM Incorporated, San Diego, CA (US)

(72) Inventors: Alberto Rico Alvarino, San Diego, CA (US); Onkar Jayant Dabeer, San Diego, CA (US); Hao Xu, San Diego, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/988,529

(22) Filed: Jan. 5, 2016

(65) Prior Publication Data

US 2016/0219618 A1    Jul. 28, 2016

Related U.S. Application Data

(60) Provisional application No. 62/108,505, filed on Jan. 27, 2015.

(51) Int. Cl.
*H04W 72/12* (2009.01)
*H04L 1/16* (2006.01)
*H04L 5/00* (2006.01)

(52) U.S. Cl.
CPC ........... *H04W 72/1294* (2013.01); *H04L 1/16* (2013.01); *H04L 5/0053* (2013.01); *H04W 72/1284* (2013.01)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS 9,137,787 B2 * 9/2015 Larsson
9,391,736 B2 * 7/2016 Nayeb Nazar ........ H04L 1/0027
(Continued)

FOREIGN PATENT DOCUMENTS

| WO | 2013063802 A1 | 5/2013 |
| WO | 2014046374 A1 | 3/2014 |
| WO | 2014069946 A1 | 5/2014 |

OTHER PUBLICATIONS

Title 47, vol. 1, Code of Federal Regulations, Oct. 1, 2013.*
International Search Report and Written Opinion—PCT/US2016/012382—ISA/EPO—dated Apr. 7, 2016.

*Primary Examiner* — Mark Rinehart
*Assistant Examiner* — Sanjay K Dewan
(74) *Attorney, Agent, or Firm* — Nerrie M. Zohn

(57) ABSTRACT

In the present disclosure, CSI and/or a plurality of ACK/NACKs related to a group of DL data transmissions may be buffered at the UE as a GACK until a DCI trigger is received from the eNB. When the DCI trigger is received, the UE may transmit the CSI and/or GACK. In this way, HARQ feedback and/or CSI may be reliably communicated even if a CCA does not clear and/or UL subframes are unavailable. In an aspect of the disclosure, a method, a computer-readable medium, and an apparatus are provided. In an aspect, the apparatus may be a UE. The apparatus monitors one or more subframes for a DCI trigger. In a further aspect, the apparatus receives the DCI trigger in a subframe. In another aspect, the apparatus transmits UCI using a subsequent subframe.

30 Claims, 16 Drawing Sheets

(56) References Cited

U.S. PATENT DOCUMENTS

| | | | |
|---|---|---|---|
| 9,485,060 B2* | 11/2016 | Nayeb Nazar | H04L 1/007 |
| 2010/0296472 A1* | 11/2010 | Lee, II | H04L 1/0026 |
| | | | 370/329 |
| 2011/0019637 A1* | 1/2011 | Ojala | H04L 1/0026 |
| | | | 370/329 |
| 2012/0044889 A1* | 2/2012 | Jen | H04L 1/1854 |
| | | | 370/329 |
| 2013/0107116 A1* | 5/2013 | Charbit | H04L 5/003 |
| | | | 348/388.1 |
| 2013/0195041 A1* | 8/2013 | Papasakellariou | H04W 72/042 |
| | | | 370/329 |
| 2013/0329678 A1* | 12/2013 | Pan | H04L 1/1635 |
| | | | 370/329 |
| 2014/0036818 A1* | 2/2014 | Koskela | H04W 72/1231 |
| | | | 370/329 |
| 2015/0208402 A1 | 7/2015 | Hwang et al. | |
| 2016/0043841 A1* | 2/2016 | Lunttila | H04L 5/0092 |
| | | | 370/280 |
| 2016/0127098 A1* | 5/2016 | Ng | H04L 5/0048 |
| | | | 370/329 |
| 2016/0157230 A1* | 6/2016 | Nord | H04L 1/1861 |
| | | | 370/329 |
| 2016/0192396 A1* | 6/2016 | Ng | H04W 74/0808 |
| | | | 370/329 |
| 2016/0255648 A1* | 9/2016 | Frenne | H04L 5/0048 |
| | | | 370/329 |
| 2016/0345344 A1* | 11/2016 | Larsson | H04W 72/1289 |
| 2017/0238311 A1* | 8/2017 | Hooli | H04W 72/0446 |
| | | | 370/329 |
| 2017/0238342 A1* | 8/2017 | Yang | H04W 74/04 |
| | | | 370/329 |

* cited by examiner

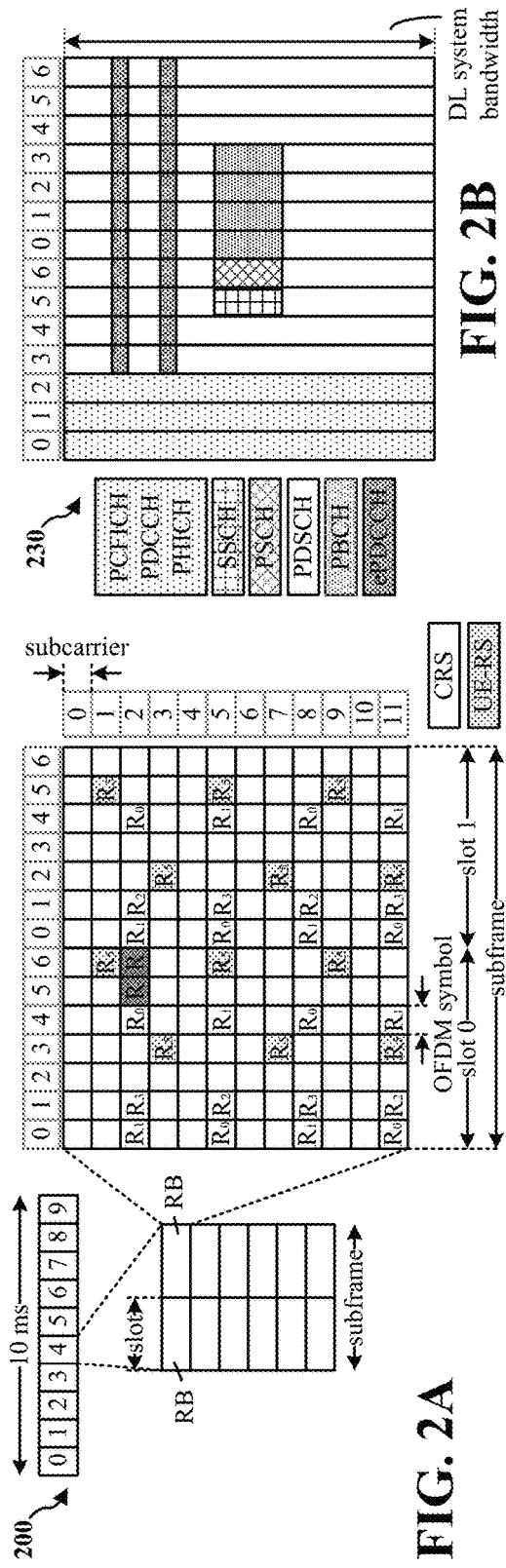
FIG. 2A
FIG. 2B
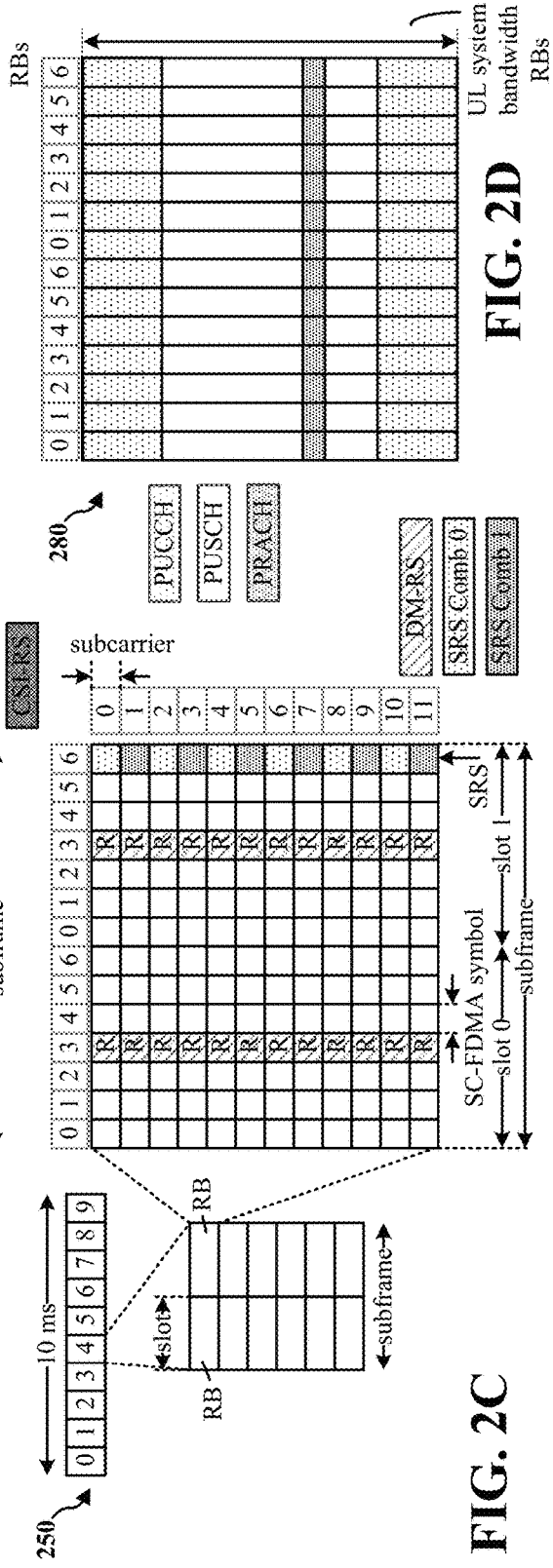
FIG. 2C
FIG. 2D

TRIGGERING A GROUP ACKNOWLEDGEMENT/NEGATIVE ACKNOWLEDGEMENT OR CHANNEL STATE INFORMATION

CROSS-REFERENCE TO RELATED APPLICATION(S)

This application claims the benefit of U.S. Provisional Application Ser. No. 62/108,505, entitled "TRIGGERING A GROUP ACKNOWLEDGEMENT/NEGATIVE ACKNOWLEDGEMENT (GACK) OR CHANNEL STATE INFORMATION (CSI)" and filed on Jan. 27, 2015, which is expressly incorporated by reference herein in its entirety.

BACKGROUND

Field

The present disclosure relates generally to communication systems, and more particularly, to triggering a acknowledgement/negative acknowledgement for a plurality of data transmissions sent in a plurality of downlink subframes.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In advanced communications using either the licensed spectrum (e.g., LTE-A) or a listen-before-talk (LBT) frame in the unlicensed spectrum (e.g., LTE-U), downlink (DL) hybrid automatic repeat request (HARQ) feedback may be transmitted from a user equipment (UE) to an evolved Node B (eNB) in predetermined uplink (UL) subframes. In addition, the UE may send channel state information (CSI) to the eNB in either periodic or aperiodic reports. However, transmitting HARQ feedback and/or CSI in this manner may be unreliable at times.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In advanced communications in either the licensed spectrum or an LBT frame in the unlicensed spectrum, DL HARQ feedback may be transmitted from the UE to an eNB in predetermined UL subframes. In addition, the UE may send CSI to the eNB in either periodic or aperiodic reports. However, transmitting HARQ feedback and/or CSI in this manner may not be reliable, e.g., if a clear channel assessment (CCA) does not clear, or no UL subframe(s) is/are available.

For example, using the licensed spectrum, HARQ feedback for data transmissions in DL subframe n may be performed in UL subframe n+4. However, if an UL transmission is not possible in UL subframe n+4, then the HARQ feedback may be lost. The same would happen for periodic CSI feedback (e.g., subframe 5 in every radio frame triggers feedback). For example, if CSI feedback is configured in the licensed spectrum to be transmitted every 20 ms, then every 20 ms there may need to be an uplink subframe configured for CSI feedback. However, in the unlicensed spectrum this might not be the case as the LBT frames may not need to be uniformly spaced. For example, in the unlicensed spectrum, subframe n may be an UL subframe and subframe n+20 may be a DL subframe.

In the present disclosure, CSI and/or a plurality of ACK/NACKs related to a group of DL data transmissions may be buffered at the UE as a GACK until a DCI trigger is received from the eNB. Once the trigger is received, the UE may transmit the CSI and/or GACK to the eNB. In this way HARQ feedback and/or CSI may be reliably communicated even if CCA does not clear and/or particular UL subframes are not available.

In an aspect of the disclosure, a method, a computer-readable medium, and an apparatus are provided. The apparatus may be a UE. The UE monitors one or more subframes for a DCI trigger. The UE receives the DCI trigger in a subframe and transmits UCI using a subsequent subframe.

In another aspect of the disclosure, a method, a computer program product, and an apparatus are provided. The apparatus may be a base station. In this aspect, the base station configures one or more subframes to include a DCI trigger. The base station transmits the DCI trigger in the one or more subframes. Then, the base station receives UCI in a subsequent subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
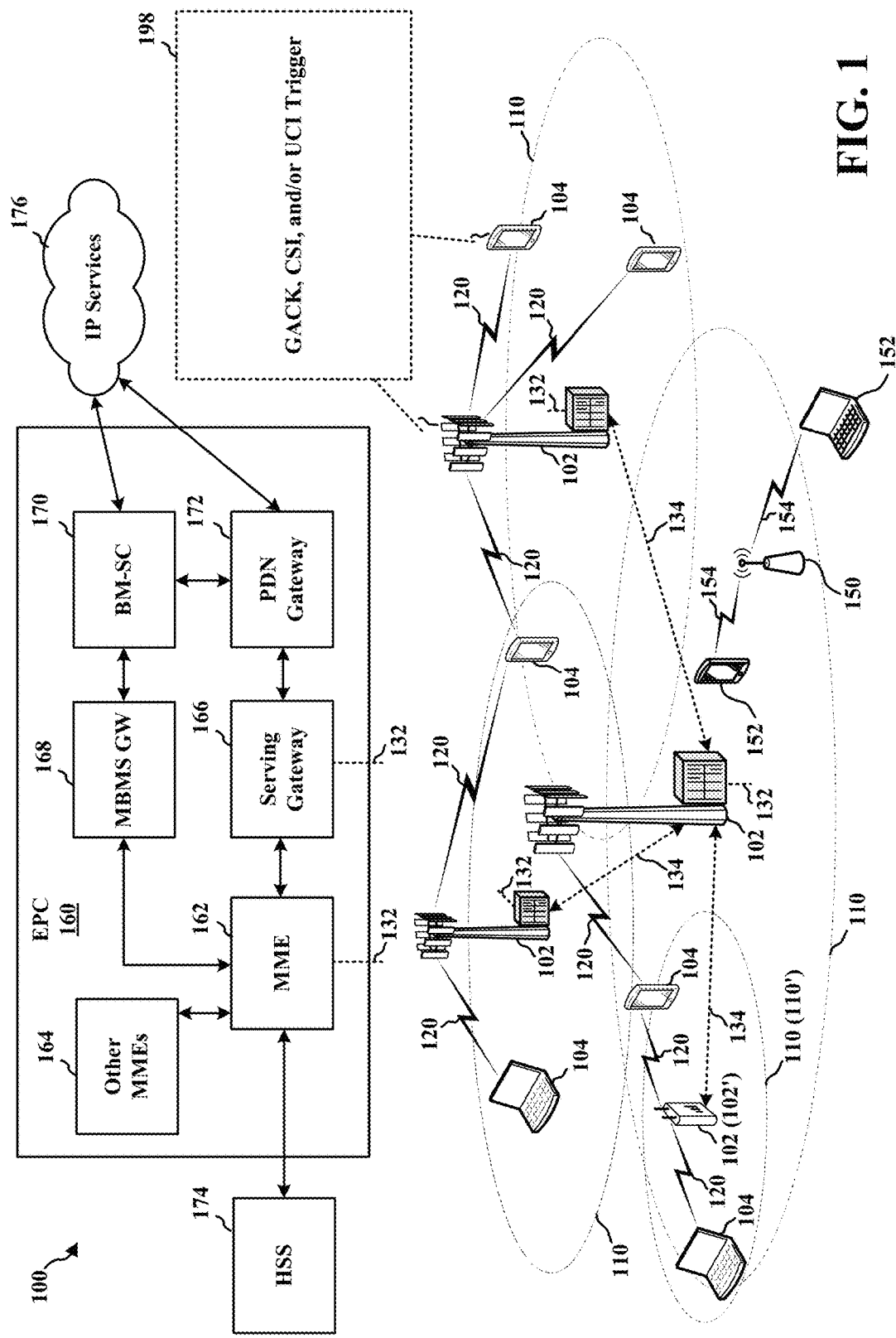
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit, to the base station 102, a GACK, CSI, and/or UCI when a trigger is received (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3, of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
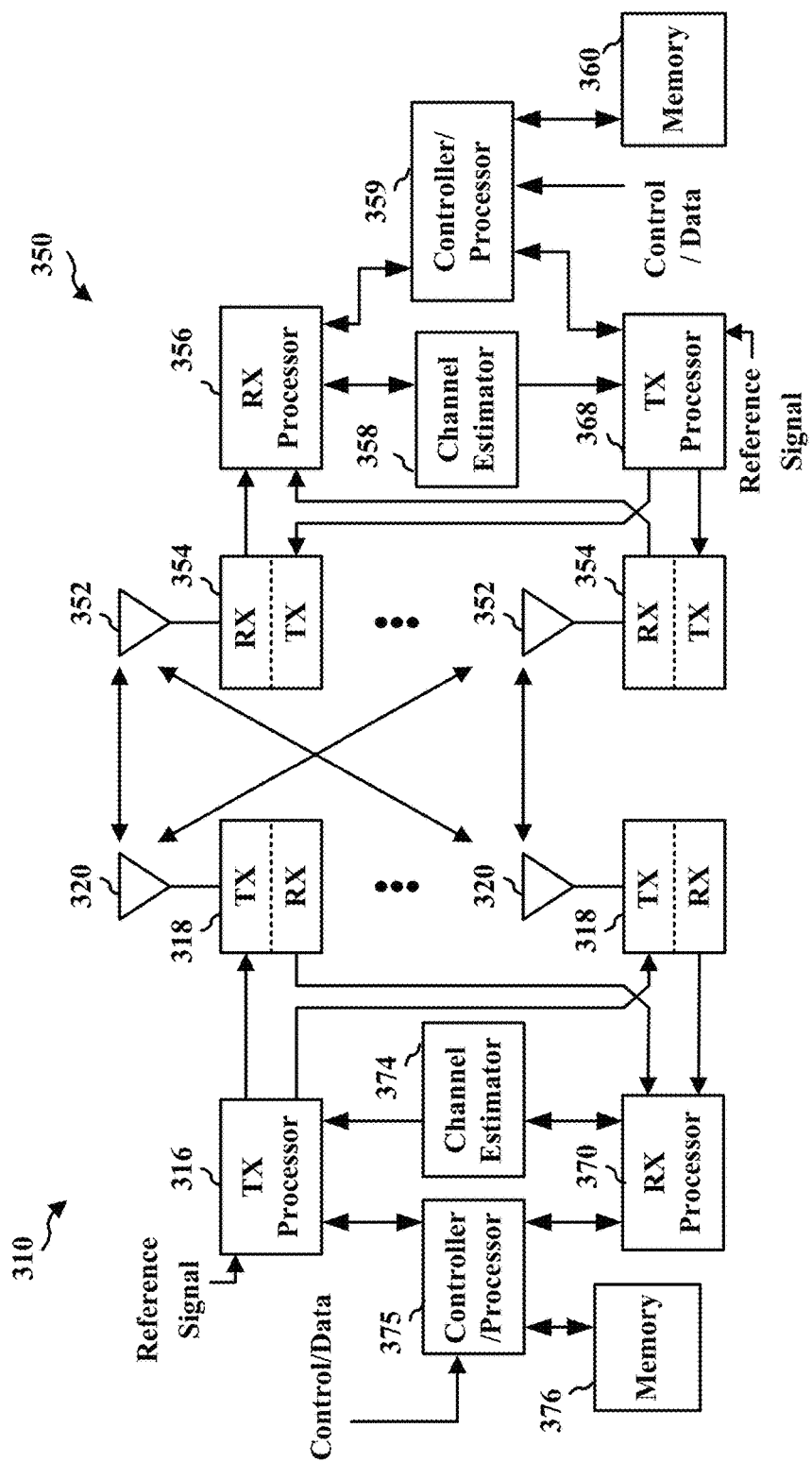
FIG. 3 is a diagram illustrating an example of an eNB and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
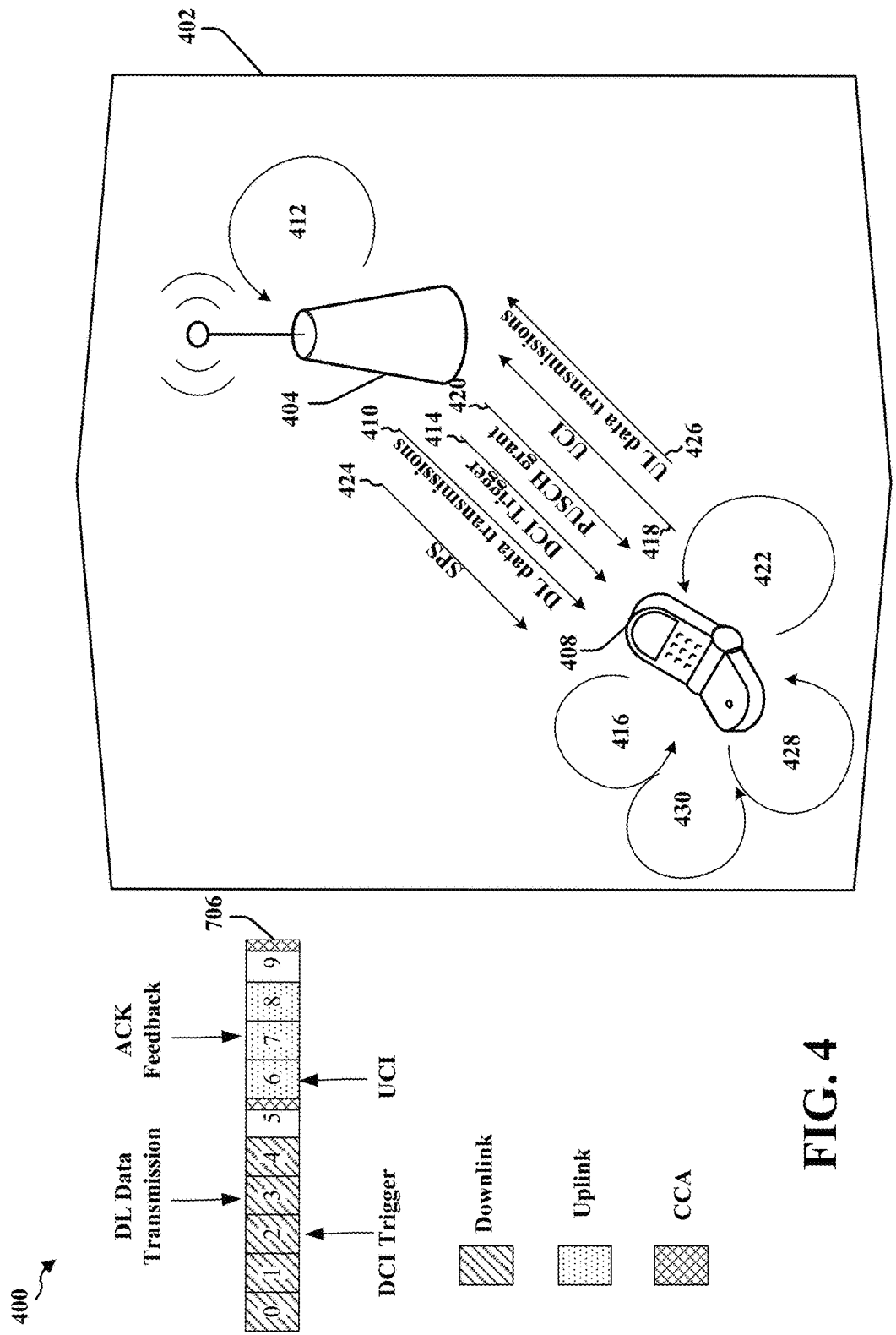
FIG. 4 is a diagram for illustrating example aspects associated with triggering a GACK, CSI, and/or UCI.

FIG. 4 is a diagram 400 for illustrating example aspects. The eNB 404 located in cell 402 may send a data transmissions 410 to the UE 408 in a plurality of DL subframes (e.g., 0, 1, 2, 3, and/or 4) in frame 406. The UE 408 may send UL data transmissions 426 to the eNB 404 in a plurality of UL subframes (e.g., 6, 7, and 8) in frame 406. The UL data transmissions 426 may be processed 412 by the eNB 404. In an aspect, the frame 406 may be a radio frame used in either the licensed spectrum or a radio frame used in a LBT frame in the unlicensed spectrum.

In the licensed spectrum, downlink HARQ feedback may be transmitted by the UE 408 at pre-configured UL subframes. For example, if the eNB 404 sends a data transmission 410 (e.g., in the PDSCH) to the UE 408 in subframe n in frame 406, the UE 408 may be configured to send an ACK feedback related to the data transmission 410 in uplink subframe n+k, where k may be determined by FDD operation (e.g., k=4) or TDD configuration. Assuming k=4, if the eNB 404 sends a data transmission 410 in DL subframe 3 in frame 406, then the ACK feedback related to the data transmission 410 may be sent by the UE 408 in UL subframe 7. In LTE-A, the eNB 404 may obtain CSI from periodic CSI or aperiodic CSI (A-CSI) from the UE 408. Obtaining CSI from periodic reports may not be reliable in the unlicensed spectrum, for example, because CCA may not be clear ahead of the period reporting time and/or no UL subframes are available during the periodic reporting time.

In the unlicensed spectrum, CSI and ACK feedback may be obtained when a DCI trigger 414 may be transmitted by the eNB 404 to one or more UEs (e.g., UE 408) that causes each of the one or more UEs 408 to send a GACK that includes a group of ACKs and/or A-CSI. For example, if the DCI trigger 414 may be sent to more than one UE 408, the DCI trigger 414 may be sent in a UE group grant to a plurality of UEs.

Still referring to FIG. 4 and assuming again that k=4, when a DCI trigger 414 for an A-CSI and/or a GACK may be transmitted in DL subframe n=2, UCI 418 including an A-CSI report and/or a GACK may be transmitted by the UE 408 in UL subframe 6. The DCI trigger 414 may include three fields to trigger an A-CSI and/or a GACK response from the UE 408. For example, each of the three fields may contain one bit or multiple bits, depending on the number of carriers and/or CSI processes.

It should be noted that in the aspects described infra, each of the three fields of the DCI trigger 414 may be configured to contain one bit for ease of illustration. The three bits of the DCI trigger 414 may be transmitted by the eNB 404 using any suitable DCI format. For example, the DCI trigger 414 may be transmitted in a UL scheduling grant using DCI format 0 or DCI format 4. In another example, the DCI trigger 414 may be transmitted in a DL scheduling grant using DCI format 1A (e.g., also referred to as DCI1). As another example, the DCI trigger 414 may be transmitted in a UE group grant for A-CSI/GACK. For example, a UE group grant may be sent in a yet undecided DCI format (e.g., referred to infra as DCI format m) for group triggering. For example, m may be an integer greater than or equal to one. The DCI trigger 414 transmitted in DCI format m may be intended for a group of UEs (not shown in FIG. 4) and may include a bitmap. Each UE in the group may process a bitmap included in the DCI trigger 414 (e.g., transmitted in DCI format m) to determine an uplink resource to be used in responding to the DCI trigger 414.

For example, a DCI trigger 414 received in DCI format m may include a 3-bit UE specific message: bit 3*i for CSI trigger, bit (3*i+1) for GACK trigger, bit (3*i+2) for GACK tag, where i may be an index of the UE in the group. Thus, each successive 3-bit value in the bitmap corresponds to a different UE. An enhanced physical uplink control channel (ePUCCH) resource may be configured for the UE 408 to send the UCI 418 containing the triggered report. The ePUCCH resources configured for the UE 408 may be configured based on the number of UEs in the group that are indexed before the given UE that have also been triggered. According to an example aspect, the UL scheduling grant may include a PUSCH grant and the DL scheduling grant may include a PDSCH grant. In the unlicensed spectrum, the PUCCH may need to carry more bits to accommodate GACK, CSI, short BSR, etc. Hence the design for LTE is enhanced to carry more bits, which is called ePUCCH.

In a first scenario, with reference to FIG. 4, if the UE 408 may be configured with a higher layer parameter, then there may be 3 fields in DCI format 0 that may contain the A-CSI/GACK information (e.g., DCI trigger 414). The UE 408 might be configured with higher layer parameters to monitor DCI format 0 with a DCI trigger 414 in certain DL subframes. In other DL subframes, DCI format 0 may not have these fields. From the perspective of the UE 408, the UE 408 may monitor different DCI sizes depending on subframe sets configured by the RRC sublayer. This may allow flexibility of A-CSI/GACK, but reduces payload size for other subframes. In other words, less of the subframe is used for control information since the added trigger space is not included in all DCI format 0 instances. The DL subframes that are monitored by the UE 408 for the DCI trigger 414 may also be a function of the UL/DL configuration (e.g., if subframe n is the subframe where PUCCH is configured to include the UCI 418, monitor for the DCI trigger 414 on subframe n-k). A grant or DCI trigger 414 may be transmitted in UE specific search space or common search space, scrambled with a cellular radio network temporary identifier (C-RNTI). The DCI trigger 414 may trigger a UCI 418 transmission from the UE 408 in UL subframe n+k, when k follows the UL scheduling timing.

In a second scenario, the UE 408 may be configured 428 by a higher layer parameter, to monitor for the DCI trigger 414 being carried using DCI format m (e.g., a UE group grant) in certain DL subframes scrambled with a group radio network temporary identifier (G-RNTI). The G-RNTI value may be signaled by higher layers. According to an example aspect, a DCI trigger 414 carried using DCI format m may be used to trigger an A-CSI and/or GACK transmission for a set of UEs. The set of UEs receiving the DCI trigger 414 in DCI format m may be configured by a higher layer parameter (e.g., RRC sublayer). The number of bits in the DCI trigger 414 being carried using DCI format m may be the same for each UE in the set.

For example, the eNB 404 may create a first group of UEs with one CSI process (e.g., A-CSI) and send a first DCI trigger using DCI format m to the first group of UEs. The eNB 404 may create a second group of UEs with 2 CSI processes and send a second DCI trigger using DCI format m to the second group of UEs. The UEs in the first group receiving a DCI trigger for A-CSI may receive one bit in the first DCI trigger, and the UEs in the second group may receive two bits in the second DCI trigger 414. In either case, a cyclic redundancy check (e.g., with 16 bits) may be included in the DCI trigger 414 and/or the UCI 418 sent in response by each UE in the group.

Moreover, UE 408 may be configured 428 by a higher layer parameter (e.g., RRC sublayer) to monitor for the DCI trigger 414 in certain DL subframes in each frame. Namely, DCI format m in certain DL subframes may not include the DCI trigger 414, and the UE 408 may be configured 428 to refrain from monitoring these DL subframes for the DCI trigger 414. The UE 408 may monitor different DCI sizes depending on the DL subframe or sets of DL subframes configured by the higher layer parameter (e.g., RRC sublayer). By configuring DCI format m in certain DL subframes, the system may be allowed flexibility of obtaining A-CSI/GACK, while reducing payload size for the other DL subframes.

For example, if the transmit power and the number of PDCCH resources are the same, and the payload is smaller, then the FER may also be smaller, which would increase the coverage for those subframes. In the second scenario, the DCI trigger 414 being carried using DCI format m may be transmitted by the eNB 404 in DL subframe 2 of frame 406, which triggers the UCI 418 to be transmitted by the UE 408 in UL subframe 6 (e.g., n+k, with k following UL scheduling timing). The DCI trigger 414 being carried by DCI format m may be transmitted in a common search space by the eNB 404. Table 1 illustrates a set of M UEs (e.g., users) in each group receiving the DCI trigger in DCI format m.

TABLE 1

| Field | Bit-width |
| --- | --- |
| A-CSI User 0 | 1 |
| GACK User 0 | 2 |
| A-CSI User 1 | 1 |
| GACK User 1 | 2 |
| ... | ... |
| A-CSI User M-1 | 1 |
| GACK User M-1 | 2 |
| CRC | 16 |
| Total | 16 + 3M |

In a third scenario, the UE 408 may be configured 428 by a higher layer parameter to monitor for the DCI trigger 414 being carried using DCI format 1A (e.g., a DL scheduling grant) in certain DL subframes. In an example method, the UE 408 may monitor 430 one or more DL subframes for the DCI trigger 414 being carried using DCI format 1A, and the UE 408 may transmit the UCI 418 to the eNB 404 in a UL subframe based on the DL subframe in which the DCI trigger 414 may be received. In the third scenario, the DCI trigger 414 being carried by DCI format 1A may be transmitted by the eNB 404 in DL subframe 2 of frame 406, which triggers the UCI 418 to be transmitted by the UE in UL subframe 6 (e.g., n+k, with k following HARQ timing).

According to an example aspect, the DCI trigger 414 may be transmitted by the eNB 404 using DCI format 0 in a PUSCH grant. In such an aspect, the UE 408 may determine 416 to transmit the UCI 418 using specific resources in a PUCCH or an ePUCCH in the UL subframe. In an aspect, the UE 408 may determine 416 the specific resources in the PUCCH by signaling from the RRC sublayer, based on a position of the PUSCH grant 420 inside the DL subframe (e.g., the position of the PUSCH grant in the PDCCH or ePDCCH), or by information in the DCI trigger 414. For example, if there 4 ePDCCH resources on which to transmit the PUSCH grant, the UE 408 may perform blind decoding on the 4 ePDCCH resources to determine which PUCCH resources may be used to transmit the UCI 418. The PUCCH resources used by the UE 408 to transmit the UCI 418 may depend on where the PUSCH grant 420 may be found. Assuming, 2 PUCCH resources (e.g., 0 and 1) and 4 EPDCCH resources (e.g., 0, 1, 2, and 3), if the PUSCH grant 420 including the DCI trigger 414 may be found in ePDCCH resource 0 or 1, the UE 408 may transmit the UCI 418 on PUCCH resource 0. If the PUSCH grant including the DCI trigger 414 may be found on ePDCCH resource 2 or 3, the UE 408 may transmit the UCI 418 on PUCCH resource 1. Alternatively, the UE 408 may determine 416 to transmit the UCI 418 in a PUSCH in the UL subframe. For example, the transmitted UCI 418 may be multiplexed with data in the PUSCH in the UL subframe. Resource element mapping may change to increase reliability of ACK transmission against bursty interference. The higher layer parameter may be used by the UE 408 to select either transmitting the UCI 418 in the PUCCH or multiplexing the UCI 418 with data in the PUSCH in the UL subframe.

Still referring to FIG. 4, in an example aspect, the eNB 404 may transmit the DCI trigger 414 using DCI format m in a UE group grant that includes an index of multiple UEs in the group. In such an aspect, the UE 408 may determine 422 a number of preceding UEs in the group that also received the DCI trigger 414 by decoding the DCI trigger 414. If the DCI trigger 414 may be carried by DCI format m and may be received without a PUSCH grant 420, the UE 408 may determine 416 specific resources in PUCCH in the UL subframe in which to transmit the UCI 418 based on its position within the grant and the number of active UEs in the grant.

In one aspect, the UE 408 may determine the specific resources in the PUCCH based on signaling from a higher layer parameter. In another aspect, the UE 408 determines the specific resources in PUCCH using the index of an active UE in the group. In such an aspect, the UE 408 may determine its own position in the index and the number of preceding UEs in the group that also received the DCI trigger 414 (e.g., the active UEs in the group). The UE 408 may access the fields in the UE group grant when the DCI trigger 414 carried by DCI format m may be decoded by the UE 408.

In an example embodiment, if the DCI trigger 414 is received in a UE group grant (e.g., DCI format m) and is received without a PUSCH grant 420 transmission from the eNB 404, then the UE 408 may transmit the UCI 418 in a subsequent UL subframe on the PUCCH or an ePUCCH with resources given by higher layer signaling and/or an index of active UEs that also receive the DCI trigger 414 in the group (e.g., UE 408 may access all the fields in the UE group grant).

For example, assume the UE 408 has index 3 in the group, and UE1 is not triggered, and UE2 is triggered, UE 408 may transmit in an UL subframe with resources including an index of 2. The ePUCCH resources may be configured by the RRC or by a position of a UE in the UE group grant. In other words, the ePUCCH resources available for use by a UE may be semi-statically configured using the RRC or dynamically set using information in the UE group grant (e.g., each UE in the group grant may determine the ePUCCH resources available for use by reading the associated 3-bit trigger as well as the 3-bit triggers of other UEs to infer the frequency resources available and deriving the time resources from the PFFICH). If the DCI trigger 414 is carried in DCI format m and is received in subframe n, and there is a PUSCH grant 420 or enhanced PUSCH (ePUSCH) grant transmission in subframe n+k, then the UE 408 may transmit the UCI 418 in the ePUCCH and/or the UE 408 may transmit the UCI 418 in ePUSCH multiplexed with data. In addition, a higher layer parameter indicating simultaneous transmission in ePUSCH and ePUCCH may be used by the UE 408 to select between these two options. Using the unlicensed spectrum, the PUSCH resources may be split into interlaces which are a group of non-contiguous RBs to satisfy bandwidth requirements. Thus, the ePUSCH is the PUSCH with the interlace structure for frequency resources.

If the eNB 404 transmits SPS information 424 to the UE 408, then the UE 408 may include the UCI 418 in a PUSCH in the UL subframe with or without receiving a PUSCH grant 420 from the eNB 404. Again, the UCI 418 may be multiplexed with data and transmitted in the PUSCH in the UL subframe. For example, the eNB 404 may trigger an individual GACK/A-CSI feedback by transmitting a DCI trigger 414 using DCI format 0 with the same resource allocation as SPS, null transport block size, e.g., modulation and coding scheme (MCS), and GACK/A-CSI trigger activated. The GACK/A-CSI may be multiplexed with data and transmitted in the PUSCH in the UL subframe, in which case the SPS might change the time instants on which the DCI trigger 414 carried using DCI format 0 may be monitored with DCI trigger 414 bits (e.g., monitor DCI format 0 with trigger bits on subframe n–k, where n is the SPS subframe and k follows the UL schedule timing).

According to one aspect, the eNB 404 may transmit the DCI trigger 414 using DCI format 1A in a PDSCH grant in the DL subframe. In such an aspect, the UE 408 may determine 416 to transmit the UCI 418 using specific resources in a PUCCH in the UL subframe if a PUSCH grant 420 may not also be transmitted by the eNB 404. For example, the UE 408 may determine 416 the specific resources in the PUCCH based on signaling from the RRC sublayer, based on a position of the PUSCH grant inside the DL subframe (e.g., the position of the PUSCH grant in the PDCCH or ePDCCH), or by information in the DCI trigger 414.

Alternatively, if a PUSCH grant 420 is also transmitted by the eNB 404, the UE 408 may determine 416 to transmit the UCI 418 in either a PUCCH in the UL subframe or a PUSCH in the UL subframe. If the UE 408 determines 416 to transmit the UCI 418 in the PUCCH in the UL subframe, the UE 408 may determine 416 the specific resources in the PUCCH by signaling from the RRC sublayer, based on a position of the PDSCH grant in the DL subframe (e.g., the position of the PDSCH grant in the PDCCH or ePDCCH), or by information in the DCI trigger 414. If the UE 408 determines 416 to transmit the UCI 418 in the PUSCH, then the UCI 418 may be multiplexed with data in the UL subframe. In an aspect, resource element mapping might change to increase reliability of ACK transmission against bursty interference. The higher layer parameter may be used to select between transmitting in the PUCCH or the PUSCH if the DCI trigger 414 is carried using DCI format 1A and a PUSCH grant 420 is received.

According to an example aspect, the eNB 404 may refrain from transmitting a DCI trigger 414 with more than one DCI format with active fields for the same UE (e.g., UE 408). In other aspects, the eNB 404 may transmit multiple DCI formats to the same UE 408 (e.g., DCI format 0 and DCI format 1A). In such aspect, one of the DCI formats transmitted to the UE 408 may contain the DCI trigger 414, which saves resources in the DL subframe but the UE 408 may have to perform additional blind detection.

Thus, a the UE 408 may be configured (e.g., by RRC sublayer) such that when both DCI format 0 and DCI format 1A are sent to the UE 408, the DCI trigger 414 may be present in one of the DCI formats. In another aspect, the eNB 404 may transmit the DCI trigger 414 in both DCI format 0 and DCI format 1A. This may simplify the blind detection by the UE 408 in the first example, but causes some redundancy. The second example, applies to active DCI triggers. For a UE 408 not being triggered by DCI format m, the eNB 404 may transmit DCI format 0 triggering A-CSI/GACK feedback in the UE 408, for example.

Figure 5:
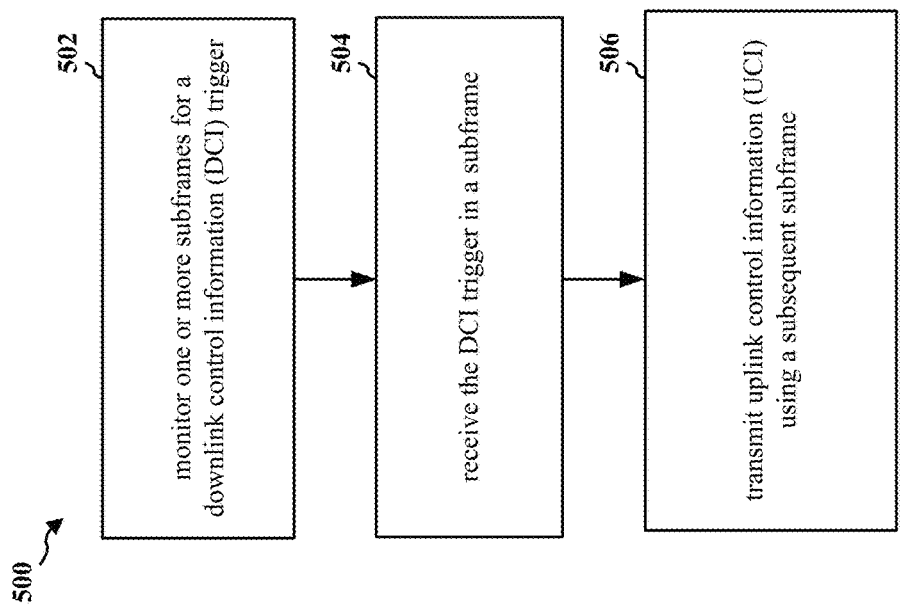
FIG. 5 is a flow chart of a method of wireless communication in accordance with various aspects.

FIG. 5 is a flow chart 500 of a first method of wireless communication. The method may be performed by a UE/mobile station, such as UE 104, 350, 408.

In step 502, a UE monitors one or more subframes for a DCI trigger. For example, referring to FIG. 4, the UE, e.g., 408 may be configured 428 by a higher layer parameter (e.g., RRC sublayer) to monitor for a DCI trigger 414 in certain DL subframes. The higher layer parameters may also configure the UE 408 to monitor for the DCI trigger 414 being carried in one or more of DCI format 0, 1A, 4, and/or m.

In step 504, the UE receives the DCI trigger in a subframe. For example, referring to FIG. 4, the UE 408 may receive the DCI trigger 414 transmitted by the eNB 404 in a DL subframe. The DCI trigger 414 may be for an A-CSI and/or a GACK.

In step 506, the UE transmits a UCI using a subsequent subframe. For example, referring to FIG. 4, the UE 408, in response to receiving the DCI trigger 414 in the DL subframe, transmits UCI 418 to the eNB 404. The UL subframe and the resources used in transmitting the UCI 418 may be configured by, for example, HARQ timing, UL timing, and/or be configured by higher layer parameters. The UCI may comprise, e.g., a GACK and/or A-CSI.

Figure 6A:
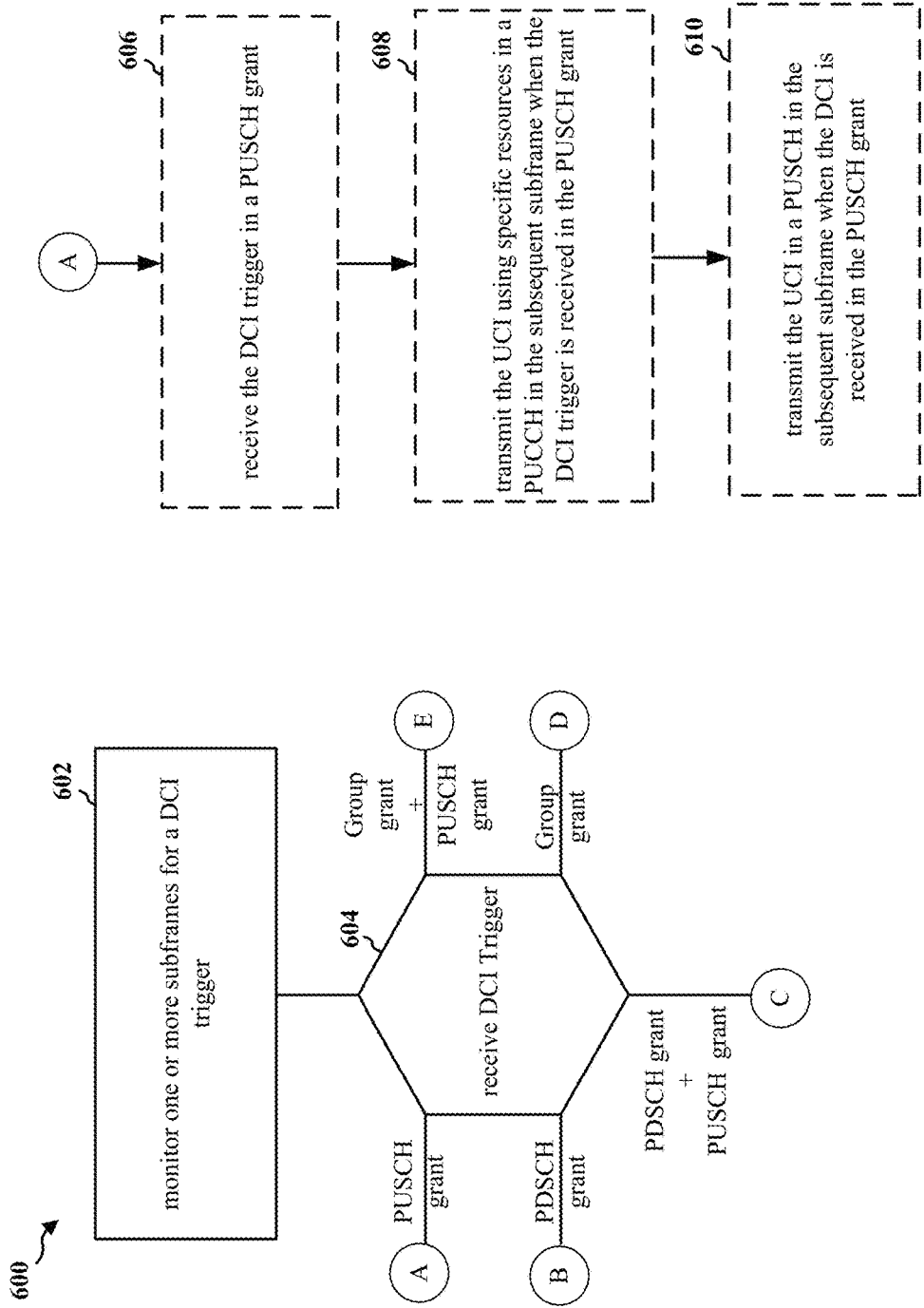
FIGS. 6A, 6B, and 6C are a flow chart of a method of wireless communication in accordance with various aspects.
Figure 6B:
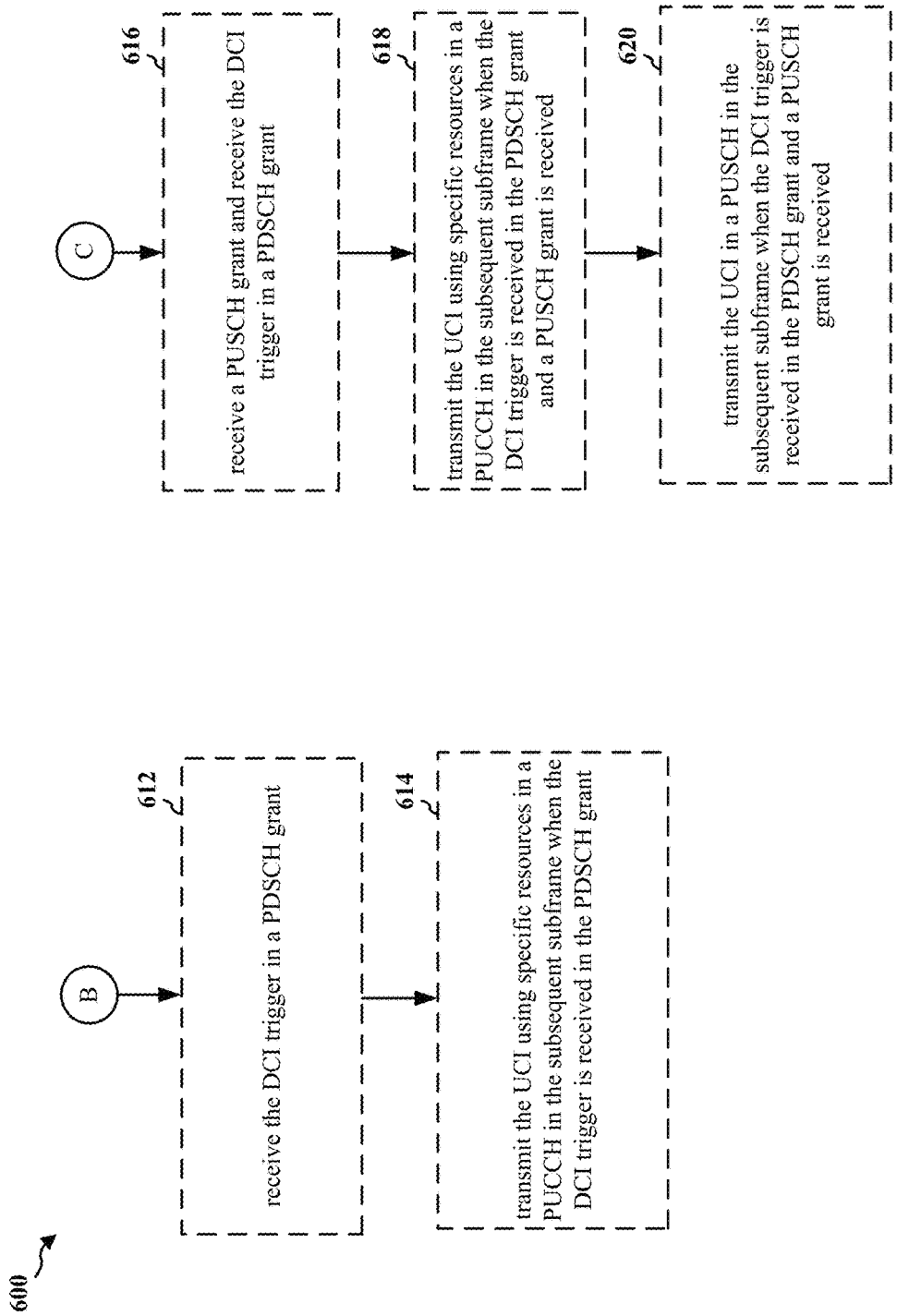
Figure 6C:
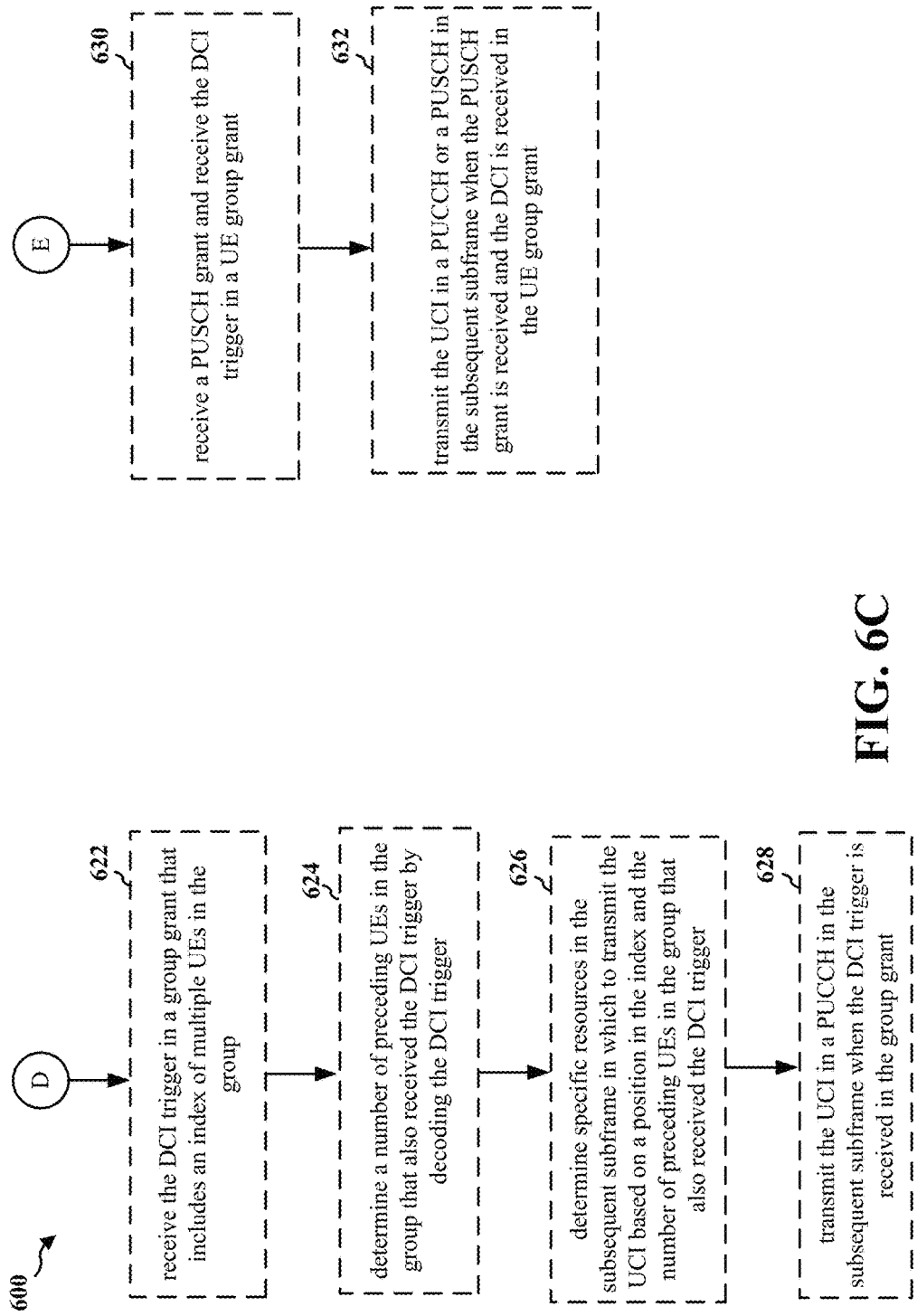

FIGS. 6A-6C illustrate a flow chart 600 of a first method of wireless communication. The method may be performed by a UE/mobile station, such as UE 104, 350, 408. It should be understood that the operations indicated with dashed lines represent optional operations for various aspects of the disclosure.

As illustrated in FIG. 6A, in step 602, the UE monitors one or more subframes for a DCI trigger. For example, referring to FIG. 4, the UE 408 may be configured 428 by a higher layer parameter (e.g., RRC sublayer) to monitor for a DCI trigger 414 in certain DL subframes. The higher layer parameters may also configure the UE 408 to monitor for the DCI trigger 414 being carried in one or more of DCI format 0, 1A, 4, and/or m.

In step 604, the UE may receive the DCI trigger. For example, the UE may receive the DCI trigger in a PUSCH grant as illustrated by path A. In an alternative example, the UE may receive the DCI trigger in a PDSCH grant as illustrated by path B. In a further alternative example, the UE may receive the DCI trigger in a PDSCH grant and also receive a PUSCH grant as illustrated by path C. In another alternative example, the UE may receive the DCI trigger in a group grant as illustrated by path D. In yet another alternative example, the UE may receive the DCI trigger in a group grant and also receive a PUSCH grant as illustrated by path E.

Still referring to FIG. 6A, in step 606 of path A, the UE may receive the DCI trigger in a PUSCH grant. For example, referring to FIG. 4, the UE 408 may receive the DCI trigger 414 in DCI format 0 from the eNB 404 in a DL subframe. The DCI trigger 414 may be for an A-CSI and/or a GACK.

In step 608 of path A, the UE may transmit the UCI using specific resources in a PUCCH in the subsequent subframe when the DCI trigger is received in the PUSCH grant. For example, referring to FIG. 4, the UE 408 may determine 416 to transmit the UCI 418 using specific resources in a PUCCH or an ePUCCH in the UL subframe. For example, the UE 408 may determine 416 the specific resources in the PUCCH by signaling from the RRC sublayer, based on a position of the PUSCH grant inside the DL subframe (e.g., the position of the PUSCH grant in the PDCCH or ePDCCH), or by information in the DCI trigger 414.

Alternatively, in step 610 of path A, the UE may transmit the UCI in a PUSCH in a subsequent subframe when the DCI is received in the PUSCH grant. For example, referring to FIG. 4, the UE 408 may determine 416 to transmit the UCI 418 in a PUSCH in the UL subframe. For example, the transmitted UCI 418 may be multiplexed with data in the PUSCH in the UL subframe.

Turning to path B in FIG. 6B, in step 612, the UE may receive the DCI trigger in a PDSCH grant. For example, referring to FIG. 4, the UE 408 may receive the DCI trigger 414 in DCI format 1 from the eNB 404 in a DL subframe. The DCI trigger 414 may be for an A-CSI and/or a GACK.

In step 614 of path B, the UE may transmit the UCI using specific resources in a PUCCH in the subsequent subframe when the DCI trigger is received in the PDSCH grant. For example, referring to FIG. 4, the UE 408 may determine 416 to transmit the UCI 418 using specific resources in a PUCCH in the UL subframe if a PUSCH grant 420 is not also transmitted by the eNB 404. For example, the UE 408 may determine 416 the specific resources in the PUCCH based on signaling from the RRC sublayer, based on a position of the PDSCH grant inside the DL subframe (e.g., the position of the PDSCH grant in the PDCCH or ePDCCH), or by information in the DCI trigger 414.

Turning to path C in FIG. 6B, in step 616, the UE may receive a PUSCH grant and receive the DCI trigger in a PDSCH grant. For example, referring to FIG. 4, the UE 408 may receive the DCI trigger 414 in DCI format 1A in a PDSCH grant in the DL subframe and a PUSCH grant 420.

In step 618 of path C, the UE may transmit the UCI using specific resources in a PUCCH in the subsequent subframe when the DCI trigger is received in the PDSCH grant and a PUSCH grant is received. For example, referring to FIG. 4, if a PUSCH grant 420 is also transmitted by the eNB 404, the UE 408 may determine 416 to transmit the UCI 418 in a PUCCH. If the UE 408 determines 416 to transmit the UCI 418 in the PUCCH in the UL subframe, the UE 408 may determine 416 the specific resources in the PUCCH in which to include the UCI 418 based on signaling from the RRC sublayer, a position of the PDSCH grant inside the DL subframe (e.g., the position of the PDSCH grant in the PDCCH or ePDCCH), or information in the DCI trigger 414.

Alternatively, in step 620 of path C, the UE may transmit the UCI in a PUSCH in a subsequent subframe when the DCI trigger is received in the PDSCH grant and a PUSCH grant is received. For example, referring to FIG. 4, if a PUSCH grant 420 is also transmitted by the eNB 404, the UE 408 may determine 416 to transmit the UCI 418 in a PUSCH. If the UE 408 determines 416 to transmit the UCI 418 in the PUSCH, then the UCI 418 may be multiplexed with data in the UL subframe.

Turning to path D in FIG. 6C, in step 622, the UE may receive the DCI trigger in a group grant that includes an index of multiple UEs in the group. For example, referring to FIG. 4, the UE 408 may receive the DCI trigger 414 in DCI format m in a UE group grant from the eNB 404. The group grant may include includes an index of multiple UEs that also received the DCI trigger 414 in DCI format m.

In step 624 of path D, the UE may determine a number of preceding UEs in the group that also received the DCI trigger by decoding the DCI trigger. For example, referring to FIG. 4, the UE 408 may access all the fields in the UE group grant, when the DCI trigger 414 carried by DCI format m is decoded by the UE 408, to determine which UEs in the group received the DCI trigger 414. If the eNB 404 transmits SPS information 424 to the UE 408, then the UE 408 may include the UCI 418 in a PUSCH in the UL subframe with or without receiving a PUSCH grant 420 from the eNB 404. Here, the UCI 418 may be multiplexed with data and transmitted in the PUSCH in the UL subframe.

In step 626 of path D, the UE may determine specific resources in the subsequent subframe in which to transmit the UCI based on a position in the index and the number of preceding UEs in the group that also received the DCI trigger. For example, referring to FIG. 4, if UE 408 has an index of 3 in the group, UE1 is not triggered, and UE2 is triggered, the UE 408 may transmit the UCI 418 in the resources with an index of 2.

In step 628 of path D, the UE may transmit the UCI in a PUCCH in the subsequent subframe when the DCI trigger is received in the group grant. For example, referring to FIG. 4, if the DCI trigger 414 is carried by DCI format m and is received without a PUSCH grant 420, the UE 408 may determine 416 specific resources in the PUCCH in which to transmit the UCI 418 based on signaling from the higher layer parameter, or based on a position in the index and the number of preceding UEs in the group that also received the DCI trigger 414 (e.g., the active UEs in the group).

Turning to path E in FIG. 6C, in step 630, the UE may receive a PUSCH grant and receive the DCI trigger in a UE group grant. For example, referring to FIG. 4, the UE 408 may receive a PUSCH grant 420 and the DCI trigger 414 in DCI format m from the eNB 404.

In step 632 of path E, the UE may transmit the UCI in a PUCCH or a PUSCH in the subsequent subframe when the PUSCH grant is received and the DCI is received in the UE group grant. For example, referring to FIG. 4, the UE 408 may select between transmitting in the PUCCH or the PUSCH based on higher layer parameters.

Figure 7:
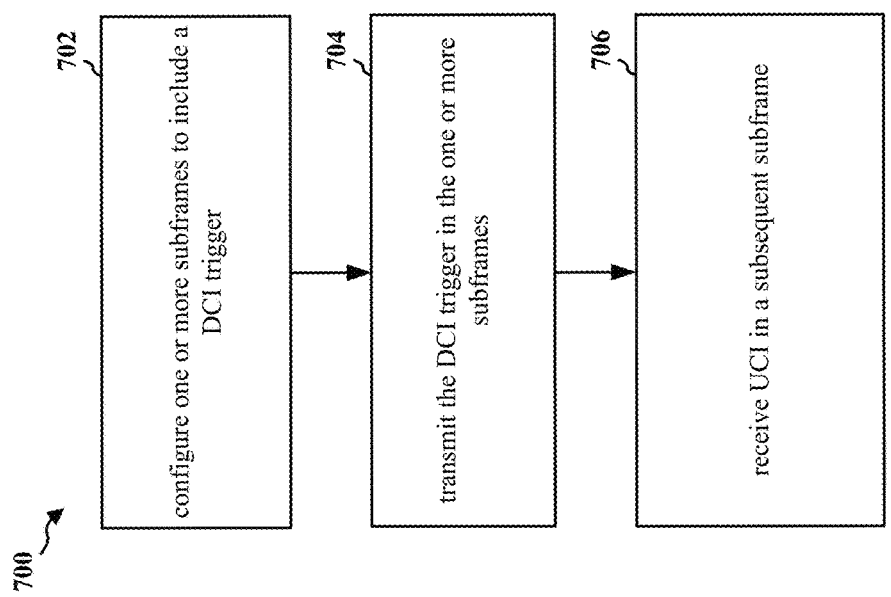
FIG. 7 is a flow chart of a method of wireless communication in accordance with various aspects.

FIG. 7 is a flow chart 700 of a first method of wireless communication. The method may be performed by an eNB/base station, such as eNB 102, 310, 404.

In step 702, the eNB may configure one or more subframes to include a DCI trigger. For example, referring to FIG. 4, the eNB, e.g., 404 may be configured 428 by a higher layer parameter (e.g., RRC sublayer) to transmit a DCI trigger 414 in certain DL subframes. The higher layer parameters may also configure the eNB 404 to transmit the DCI trigger 414 in one or more of DCI format 0, 1A, 4, and/or m.

In step 704, the eNB may transmit the DCI trigger in the one or more subframes. For example, referring to FIG. 4, the eNB 404 may transmit the DCI trigger 414 in a DL subframe. The DCI trigger 414 may be for an A-CSI and/or a GACK.

In step 706, the eNB may receive UCI in a subsequent subframe. The UCI may include, e.g., a GACK and/or A-CSI. For example, referring to FIG. 4, the eNB 404 may receive the UCI 418 to the UE 408 in response to the DCI trigger 414. The UL subframe and the resources used in transmitting the UCI 418 may be configured by, for example, HARQ timing, UL timing, and/or be configured by higher layer parameters.

Figure 8A:
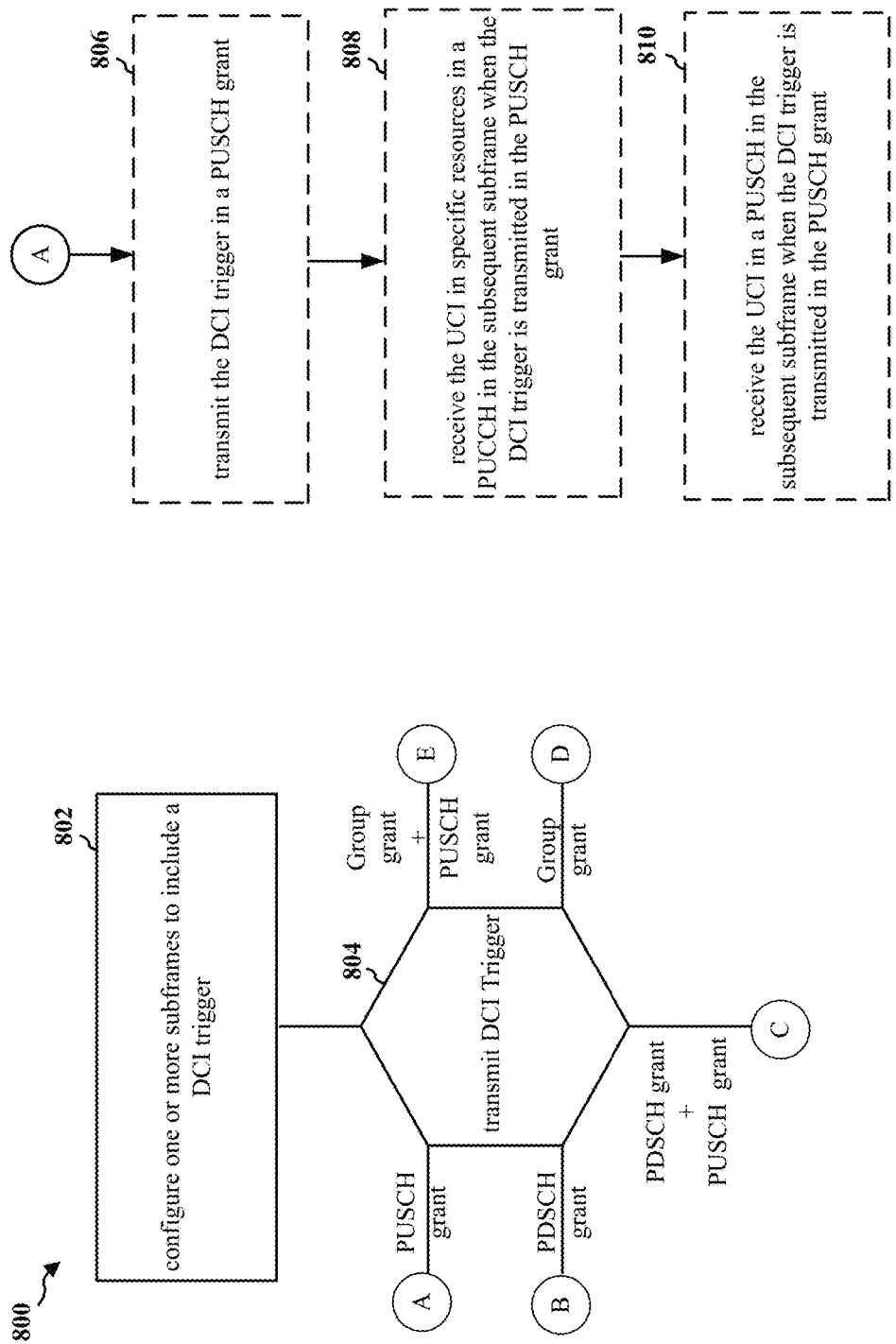
FIGS. 8A, 8B, and 8C are a flow chart of a method of wireless communication in accordance with various aspects.
Figure 8B:
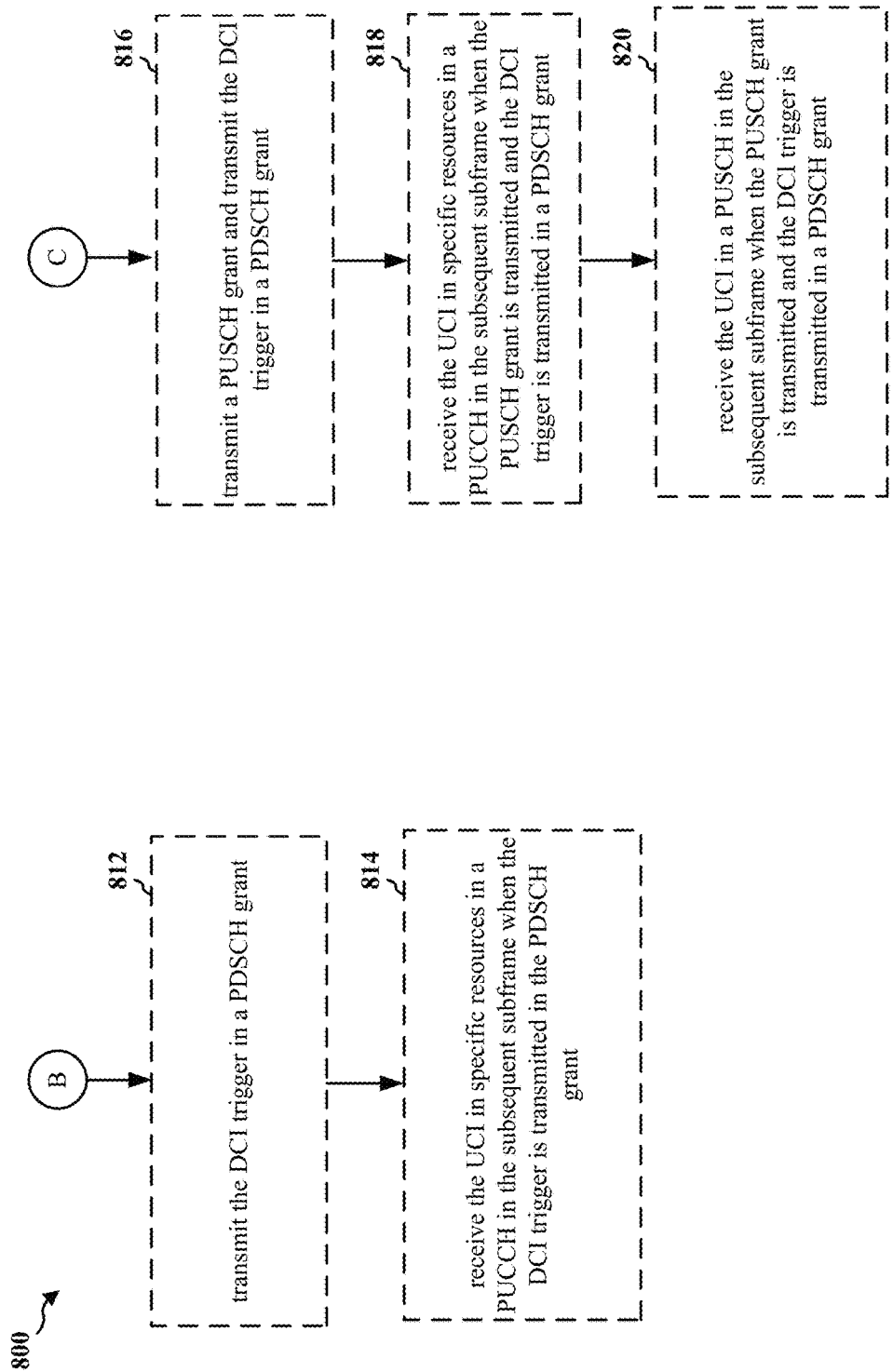
Figure 8C:
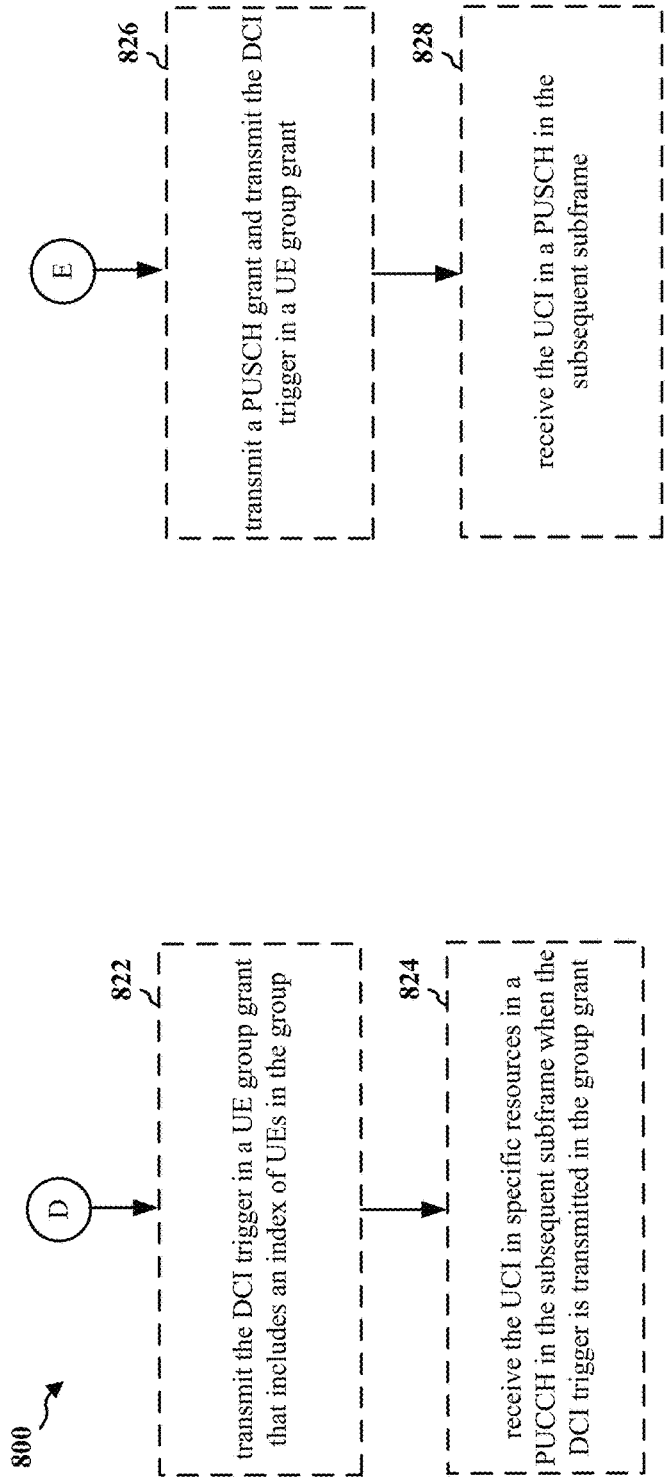

FIGS. 8A-8C illustrate a flow chart 800 of a first method of wireless communication. The method may be performed by an eNB/base station, such as eNB 102, 310, 404. It should be understood that the operations indicated with dashed lines represent operations for various aspects of the disclosure.

As illustrated in FIG. 8A, in step 802, the eNB may configure one or more subframes to include a DCI trigger. For example, referring to FIG. 4, the eNB 404 may be configured 428 by a higher layer parameter (e.g., RRC sublayer) to transmit a DCI trigger 414 in certain DL subframes. The higher layer parameters may also configure the eNB 404 to transmit the DCI trigger 414 in one or more of DCI format 0, 1A, 4, and/or m.

In step 804, the eNB may transmit the DCI trigger. For example, the eNB may transmit the DCI trigger in a PUSCH grant as illustrated by path A. In an alternative example, the eNB may transmit the DCI trigger in a PDSCH grant as illustrated by path B. In a further alternative example, the eNB may transmit the DCI trigger in a PDSCH grant and also receive a PUSCH grant as illustrated by path C. In another alternative example, the eNB may transmit the DCI trigger in a group grant as illustrated by path D. In yet another alternative example, the eNB may transmit the DCI trigger in a group grant and also receive a PUSCH grant as illustrated by path E.

Still referring to FIG. 8A, in step 806 of path A, the eNB may transmit the DCI trigger in a PUSCH grant. For example, referring to FIG. 4, the eNB 404 may transmit the DCI trigger 414 in DCI format 0 in a DL subframe to the UE 408. The DCI trigger 414 may be for an A-CSI and/or a GACK.

In step 808 of path A, the eNB may receive the UCI in specific resources in a PUCCH in the subsequent subframe when the DCI trigger is transmitted in the PUSCH grant. For example, referring to FIG. 4, the eNB 404 may receive the UCI 418 in specific resources in a PUCCH or an ePUCCH in the UL subframe. For example, the specific resources in the PUCCH may be determined by signaling from the RRC sublayer, based on a position of the PUSCH grant inside the DL subframe (e.g., the position of the PUSCH grant in the PDCCH or ePDCCH), or by information in the DCI trigger 414.

Alternatively, in step 810 of path A, the eNB may receive the UCI in a PUSCH in the subsequent subframe when the DCI trigger is transmitted in the PUSCH grant. For example, referring to FIG. 4, the eNB 404 may receive the UCI 418 in a PUSCH in the UL subframe. For example, the received UCI 418 may be multiplexed with data in the PUSCH in the UL subframe.

Turning to path B in FIG. 8B, in step 812, the eNB may transmit the DCI trigger in a PDSCH grant. For example, referring to FIG. 4, the eNB 404 may transmit the DCI trigger 414 in DCI format 1 in a DL subframe. The DCI trigger 414 may be for an A-CSI and/or a GACK.

In step 814 of path B, the eNB may receive the UCI in specific resources in a PUCCH in the subsequent subframe when the DCI trigger is transmitted in the PDSCH grant. For example, referring to FIG. 4, the eNB 404 may receive the UCI 418 in specific resources in a PUCCH in the UL subframe if a PUSCH grant 420 is not also transmitted by the eNB 404. For example, the specific resources in the PUCCH may be determined based on signaling from the RRC sublayer, based on a position of the PDSCH grant inside the DL subframe (e.g., the position of the PDSCH grant in the PDCCH or ePDCCH), or by information in the DCI trigger 414.

Turning to path C in FIG. 8B, in step 816, the eNB may transmit a PUSCH grant and transmit the DCI trigger in a PDSCH grant. For example, referring to FIG. 4, the eNB 404 may transmit a PUSCH grant 420 and transmit the DCI trigger 414 in DCI format 1A in a PDSCH grant in the DL subframe.

In step 818 of path C, the eNB may receive the UCI in specific resources in a PUCCH in the subsequent subframe when the PUSCH grant is transmitted and the DCI trigger is transmitted in a PDSCH grant. For example, referring to FIG. 4, if a PUSCH grant 420 is also transmitted by the eNB 404, the eNB 404 may receive the UCI 418 in a PUCCH. The specific resources in the PUCCH in which the UCI 418 is received may be determined by signaling from the RRC sublayer, based on a position of the PDSCH grant inside the DL subframe (e.g., the position of the PDSCH grant in the PDCCH or ePDCCH), or by information in the DCI trigger 414.

Alternatively, in step 820 of path C, the eNB may receive the UCI in a PUSCH in the subsequent subframe the PUSCH grant is transmitted and the DCI trigger is transmitted in a PDSCH grant. For example, referring to FIG. 4, if a PUSCH grant 420 is also transmitted by the eNB 404, the eNB 404 may receive the UCI 418 in a PUSCH. The UCI 418 may be multiplexed with data in the UL subframe.

Turning to path D in FIG. 8C, in step 822, the eNB may transmit the DCI trigger in a UE group grant that includes an index of UEs in the group. For example, referring to FIG. 4, the eNB 404 may transmit the DCI trigger 414 in DCI format m in a UE group grant. The group grant may include includes an index of multiple UEs that receive the DCI trigger 414 in DCI format m. In addition, the eNB 404 may transmit SPS information 424 to the UE 408 and the DCI trigger 414 in DCI format m.

In step 824 of path D, the eNB may receive the UCI in specific resources in a PUCCH in the subsequent subframe when the DCI trigger is transmitted in the group grant. For example, referring to FIG. 4, if the DCI trigger 414 may be transmitted to the UE 408 in DCI format m and a PUSCH grant 420 is not transmitted, the specific resources in the PUCCH in which the UCI 418 is transmitted may be determined based on signaling from the higher layer parameter or based on its own position in the index and the number of preceding UEs in the group that also received the DCI trigger 414 (e.g., the active UEs in the group). In addition, still referring to FIG. 4, referring to FIG. 4, the UE 408 may access all the fields in the UE group grant to determine which UEs in the group received the DCI trigger 414. For example, if UE 408 has index of 3 in the group, UE1 is not triggered, and UE2 is triggered, the UE 408 may transmit the UCI 418 in the resources with an index of 2. Alternatively, if the eNB 404 transmits SPS information 424 to the UE 408, then the UE 408 may include the UCI 418 in a PUSCH in the UL subframe with or without receiving a PUSCH grant 420 from the eNB 404. Here, the UCI 418 may be multiplexed with data and transmitted in the PUSCH in the UL subframe.

Turning to path E in FIG. 8C, in step 826, the eNB may transmit a PUSCH grant and transmit the DCI trigger in a UE group grant. For example, referring to FIG. 4, the eNB 404 may transmit a PUSCH grant 420 and transmit the DCI trigger 414 in DCI format m.

In step 828 of path E, the eNB may receive the UCI in a PUSCH in the subsequent subframe. For example, referring to FIG. 4, the UE 408 may select between transmitting in the PUCCH or the PUSCH to the eNB 404 based on higher layer parameters.

Figure 9:
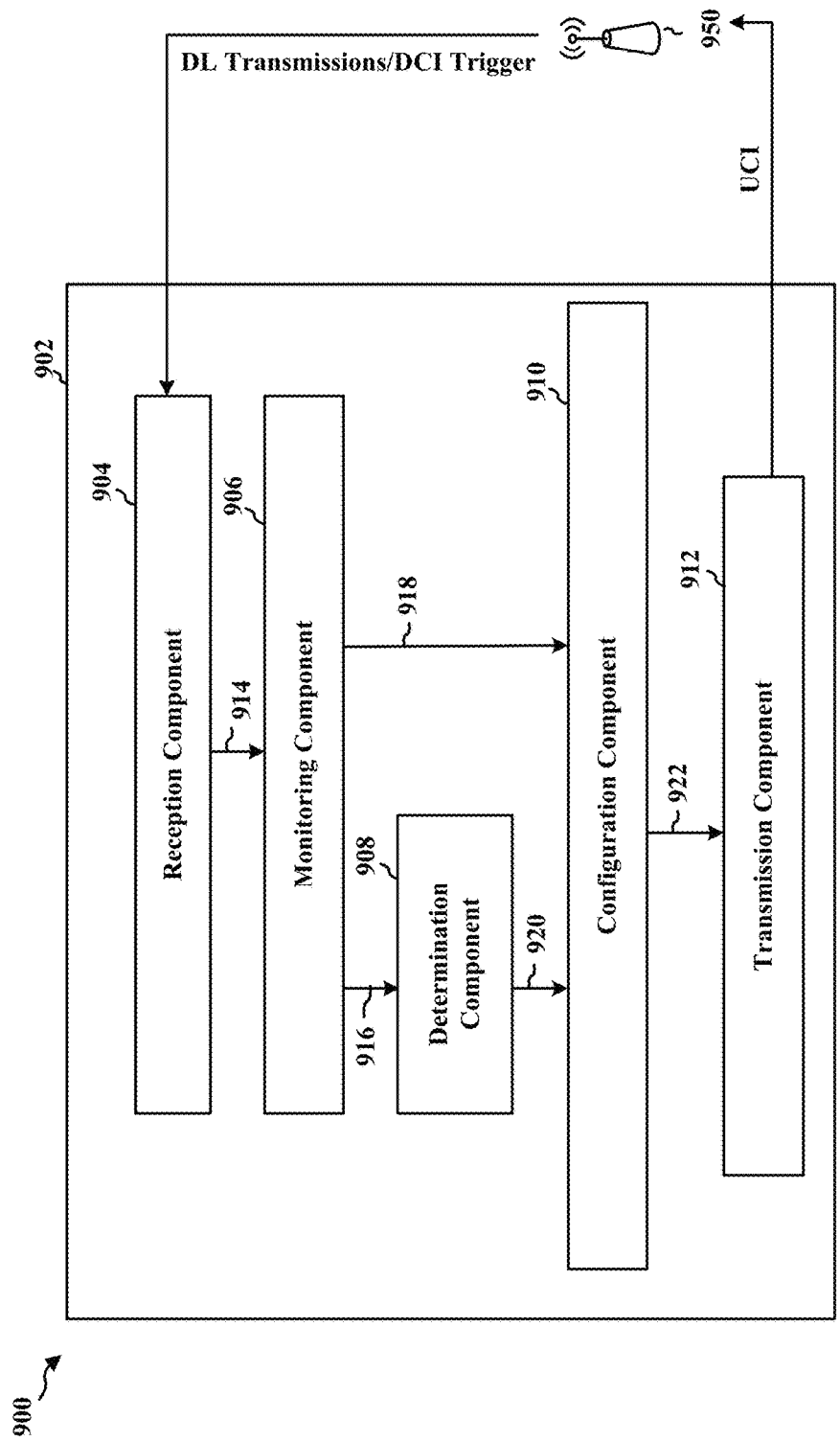
FIG. 9 is a conceptual data flow diagram illustrating the data flow between different means/components in an example apparatus.

FIG. 9 is a conceptual data flow diagram 1200 illustrating the data flow between different means/components in an example apparatus 902. The apparatus may be a UE, such as UE 104, 350, 408. The apparatus includes a reception component 904 that receives communication from the eNB 950. The received communication may include, e.g., the DCI trigger in a subframe, the DCI trigger in a PUSCH grant, the DCI trigger in a PDSCH grant, and/or the DCI trigger in a UE group grant that includes an index of multiple UEs in the group. The reception component 904 also sends a DL signal 914 to the monitoring component 906 to monitor for the DCI trigger. The monitoring component 906 monitors one or more DL subframes for the DCI trigger by monitoring the DL signals 914 sent by the reception component 904. A signal 918 related to the DCI trigger may be sent by the monitoring component 906 to configuration component 910 if a DCI trigger is not received.

If the DCI trigger is received in the UE group grant, then a signal 916 including information related to the DCI trigger/UE group grant may be sent to a determination component 908 that determines a number of preceding UEs in the group that also received the DCI trigger by decoding the DCI trigger. The determination component 908 may also determine specific resources in the subsequent subframe in which to transmit the UCI based on a position in the index and the number of preceding UEs in the group that also received the DCI trigger. A signal 920 related to the DCI trigger/UE group grant may then be sent from monitoring component 906 to configuration component 910 for configuration.

If the DCI trigger is received in a PUSCH grant or a PDSCH grant, then a signal 920 may be sent to the configuration component 910 that configures the specific resources in the PUCCH to transmit the UCI by RRC signaling. For example, the specific resources may be configured by configuration component 910 based on a position of the PDSCH grant inside the DL subframe (e.g., the position of the PDSCH grant in the PDCCH or ePDCCH), by a position of the DCI trigger in the UE group grant, or by the DCI trigger.

The configuration component 910 may send a signal 922 including information related to the configured UCI to transmission component 912. The transmission component 912 may transmit the UCI to the eNB using specific resources in a PUCCH in a subsequent subframe, transmit the UCI in a PUSCH in a subsequent subframe, transmit the UCI in a PUCCH or a PUSCH in a subsequent subframe, and/or transmit the UCI in a PUSCH in a subsequent subframe without receiving a PUSCH grant.

The apparatus may include additional components that perform each of the blocks of the algorithm in the aforementioned flowcharts of FIGS. 5 and 6A-6C. As such, each block in the aforementioned flowcharts of FIGS. 5 and 6A-6C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
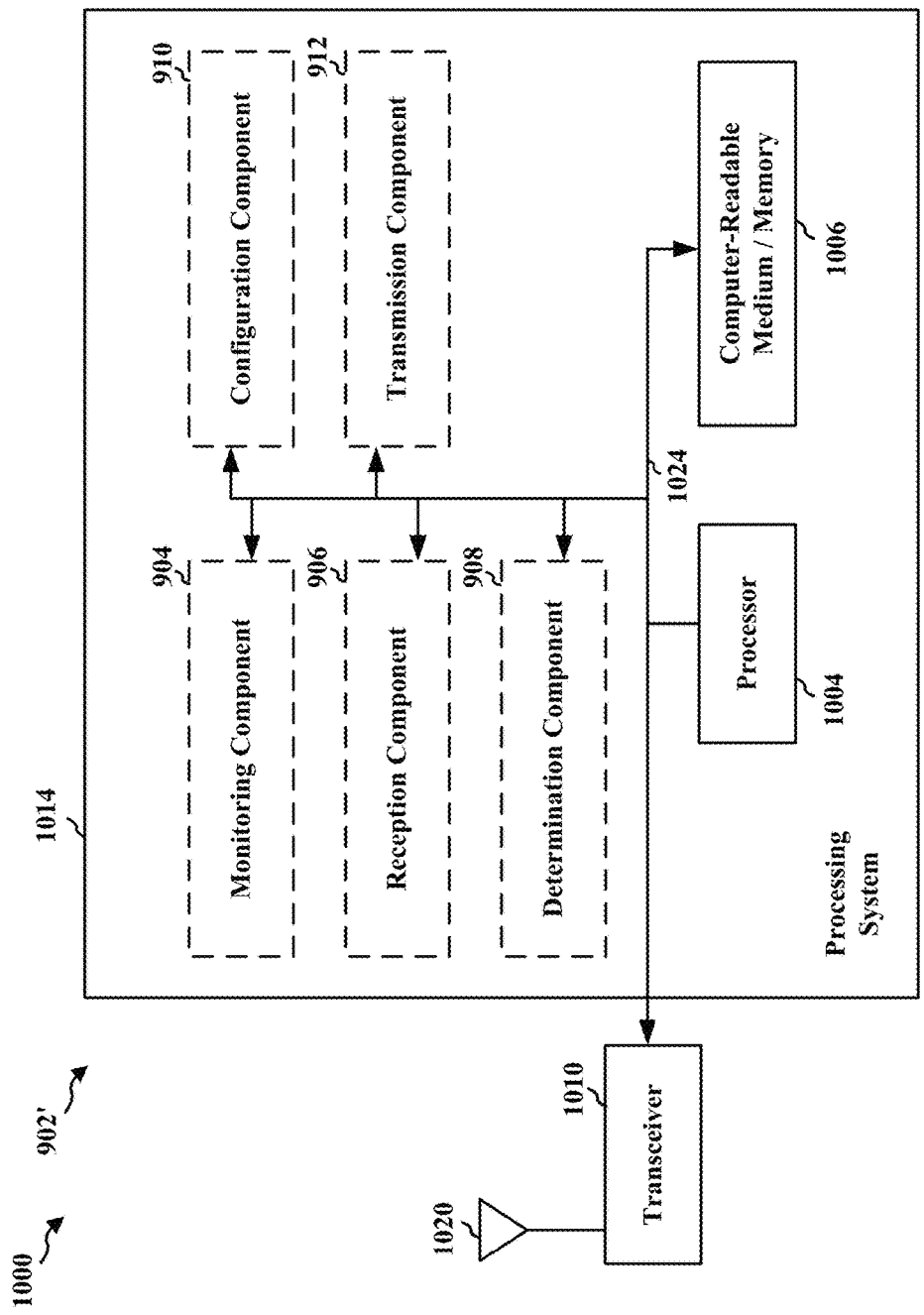
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, may not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 906. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006.

The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, and 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for monitoring one or more subframes for a DCI trigger. In an aspect, the apparatus 902/902' for wireless communication includes means for receiving the DCI trigger in a subframe. In another aspect, the apparatus 902/902' for wireless communication includes means for transmitting UCI using a subsequent subframe. In a further aspect, the apparatus 902/902' for wireless communication may include means for receiving the DCI trigger in a PUSCH grant. In yet another aspect, the apparatus 902/902' for wireless communication may include means for transmit the UCI using specific resources in a PUCCH in the subsequent subframe when the DCI trigger is received in the PUSCH grant. In still another aspect, the apparatus 902/902' for wireless communication may include means for transmitting the UCI in a PUSCH in the subsequent subframe when the DCI is received in the PUSCH grant. In yet a further aspect, the apparatus 902/902' for wireless communication may include means for receiving the DCI trigger in a PDSCH grant. Still further, the apparatus 902/902' for wireless communication may include means for transmitting the UCI using specific resources in a PUCCH in the subsequent subframe when the DCI trigger is received in the PDSCH grant. Further still, the apparatus 902/902' for wireless communication may include means for receiving a PUSCH grant and receive the DCI trigger in a PDSCH grant. In another aspect, the apparatus 902/902' for wireless communication may include means for transmitting the UCI using specific resources in a PUCCH in the subsequent subframe when the DCI trigger is received in the PDSCH grant and a PUSCH grant is received. In a further aspect, the apparatus 902/902' for wireless communication may include means for transmitting the UCI in a PUSCH in the subsequent subframe when the DCI trigger is received in the PDSCH grant and a PUSCH grant is received. Further still, the apparatus 902/902' for wireless communication may include means for receiving the DCI trigger in a group grant that includes an index of multiple UEs in the group. In a further aspect, the apparatus 902/902' for wireless communication may include means for transmitting the UCI in a PUCCH in the subsequent subframe when the DCI trigger is received in the group grant. Still further, the apparatus 902/902' for wireless communication may include means for determining a number of preceding UEs in the group that also received the DCI trigger by decoding the DCI trigger. In yet another aspect, the apparatus 902/902' for wireless communication may include means for determining specific resources in the subsequent subframe in which to transmit the UCI based on a position in the index and the number of preceding UEs in the group that also received the DCI trigger. In yet a further aspect, the apparatus 902/902' for wireless communication may include means for receiving a PUSCH grant and means for receiving the DCI trigger in a UE group grant. In another aspect, the apparatus 902/902' for wireless communication may include means for transmitting the UCI in a PUCCH or a PUSCH in the subsequent subframe when the PUSCH grant is received and the DCI is received in the UE group grant. In another aspect, the apparatus 902/902' for wireless communication may include means for transmitting the UCI in a PUSCH in the subsequent subframe when the DCI trigger is received in the UE group grant without receiving a PUSCH grant. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 668, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
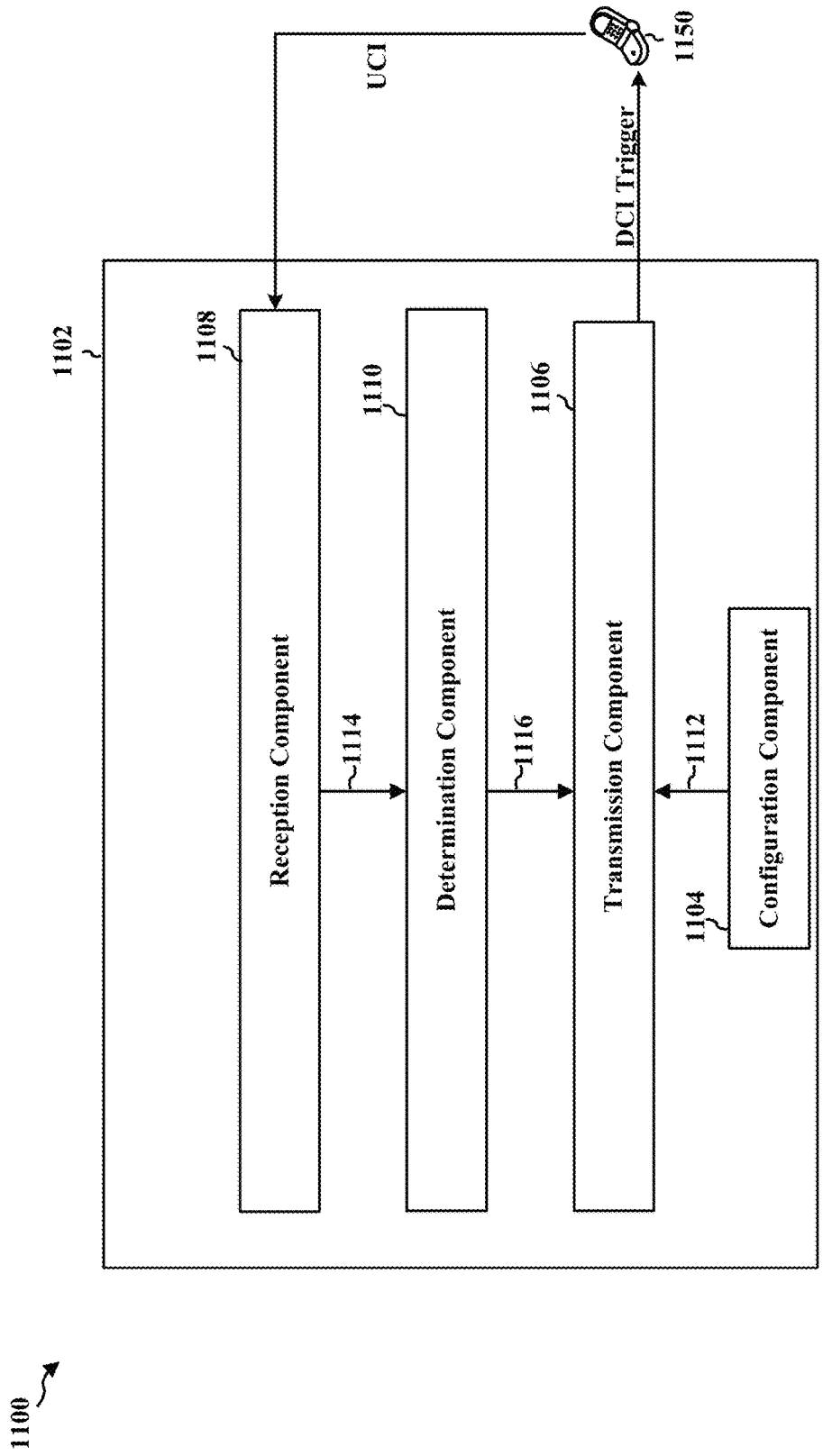
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be an eNB, such as eNB 102, 310, 404. The apparatus may include a configuration component 1104 that configures one or more subframes to include a DCI trigger. The configuration component 1104 may send subframe configuration information 1112 to transmission component 1106. The transmission component 1106 may transmit the DCI trigger to at least one UE 1150. For example, the transmission component 1106 may transmit the DCI trigger in one or more subframes, transmit the DCI trigger in a PUSCH grant, transmit the DCI trigger in a PDSCH grant, transmit a PUSCH grant, and/or transmit the DCI trigger in a UE group grant that includes an index of UEs in the group.

The reception component 1108 may receive UCI in a subsequent subframe, receive the UCI in specific resources in a PUCCH in a subsequent subframe, receive the UCI in a PUSCH in a subsequent subframe, and/or receive the UCI in specific resources in a PUCCH in a subsequent subframe. The reception component 1108 may send information 1111 related to the UCI to the determination component 1110.

The determination component 1110 may determine if transmissions sent the UE 1150 need to be repeated based on the information 1111 related to the received UCI. If the determination component 1110 determines that transmissions need to be repeated, information 1116 may be sent to transmission component 1106, which may retransmit data and/or a DCI trigger to the UE 1150.

The apparatus may include additional components that perform each of the blocks of the algorithm in the aforementioned flowcharts of FIGS. 7 and 8A-8C. As such, each block in the aforementioned flowcharts of FIGS. 7 and 8A-8C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
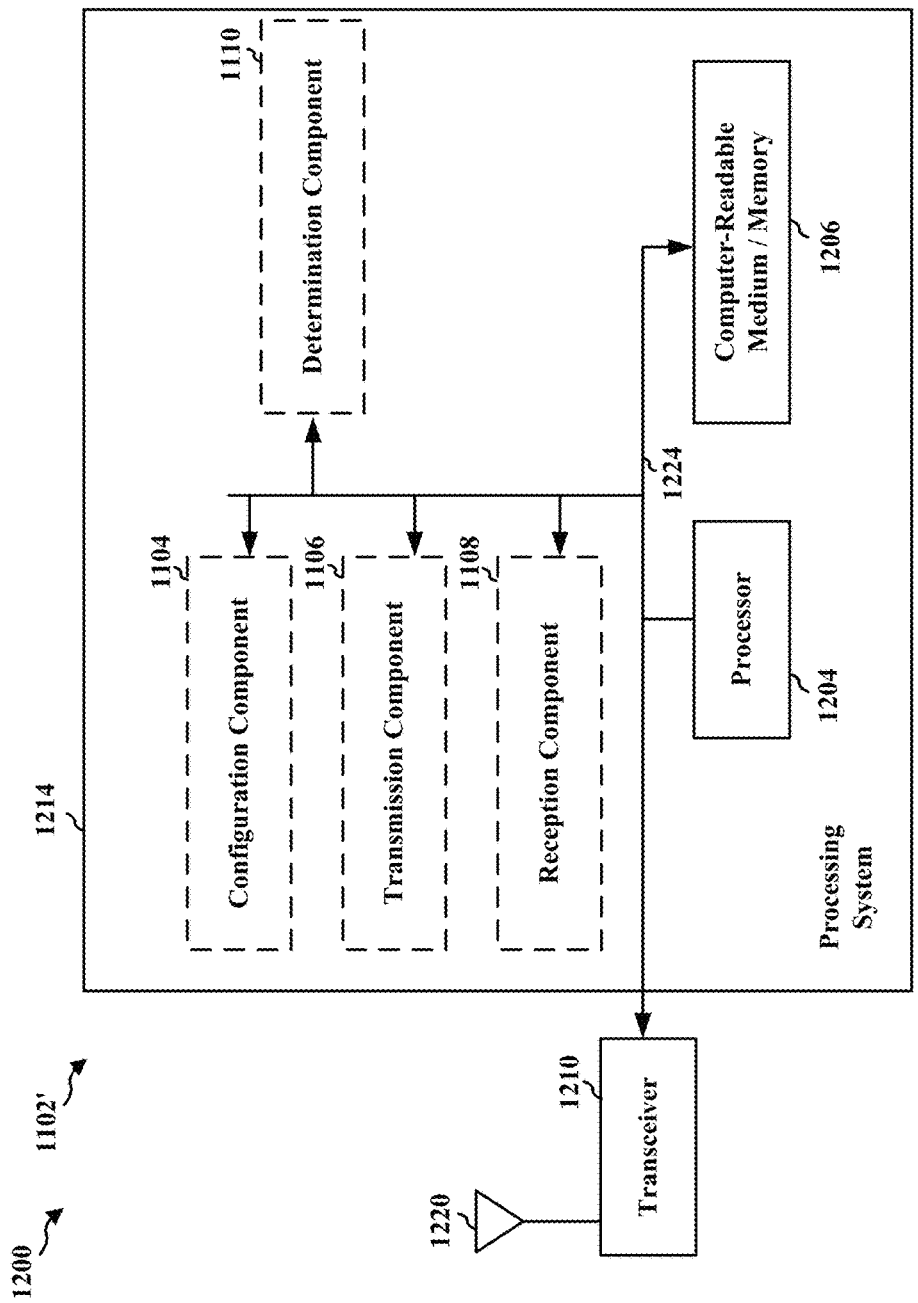
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, and the computer-readable medium/memory 1206. The bus 1224 may also link various other circuits such as timing sources, peripherals, voltage regulators, and power management circuits, which are well known in the art, and therefore, may not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1108. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the eNB 310 and may include the memory 376 and/or at least one of the TX processor 316, the RX processor 370, and the controller/processor 375.

In one configuration, the apparatus 1102/1102' for wireless communication includes means for configuring one or more subframes to include a DCI trigger. In another aspect, the apparatus 1102/1102' for wireless communication includes means for transmitting the DCI trigger in the one or more subframes. In a further aspect, the apparatus 1102/1102' for wireless communication includes means for receive UCI in a subsequent subframe. In yet another aspect, the apparatus 1102/1102' for wireless communication may include means for transmitting the DCI trigger in a PUSCH grant. Still further, the apparatus 1102/1102' for wireless communication may include means for receiving the UCI in specific resources in a PUCCH in the subsequent subframe when the DCI trigger is transmitted in the PUSCH grant. In still a further aspect, the apparatus 1102/1102' for wireless communication may include means for receiving the UCI in a PUSCH in the subsequent subframe when the DCI trigger is transmitted in the PUSCH grant. Further still, the apparatus 1102/1102' for wireless communication may include means for transmitting the DCI trigger in a PDSCH grant. In yet another aspect, the apparatus 1102/1102' for wireless communication may include means for receiving the UCI in specific resources in a PUCCH in the subsequent subframe when the DCI trigger is transmitted in the PDSCH grant. In still a further aspect, the apparatus 1102/1102' for wireless communication may include means for transmitting a PUSCH grant and transmit the DCI trigger in a PDSCH grant. In yet another aspect, the apparatus 1102/1102' for wireless communication may include means for receiving the UCI in specific resources in a PUCCH in the subsequent subframe when the PUSCH grant is transmitted and the DCI trigger is transmitted in a PDSCH grant. Still further, the apparatus 1102/1102' for wireless communication may include means for receiving the UCI in a PUSCH in the subsequent subframe when the PUSCH grant is transmitted and the DCI trigger is transmitted in a PDSCH grant. In still another aspect, the apparatus 1102/1102' for wireless communication may include means for transmitting the DCI trigger in a UE group grant that includes an index of UEs in the group. In a further aspect, the apparatus 1102/1102' for wireless communication may include means for receiving the UCI in specific resources in a PUCCH in the subsequent subframe when the DCI trigger is transmitted in the group grant. In another aspect, the apparatus 1102/1102' for wireless communication may include means for receiving the UCI in specific resources in the subsequent subframe configured by the index of UEs in the group and a number of preceding UEs in the group that also received the DCI trigger when the DCI trigger is transmitted in the group grant. Still further, the apparatus 1102/1102' for wireless communication may include means for transmitting a PUSCH grant and transmit the DCI trigger in a UE group grant. In yet another aspect, the apparatus 1102/1102' for wireless communication may include means for receiving the UCI in a PUSCH in the subsequent subframe. In a further aspect, the apparatus 1102/1102' for wireless communication may include means for transmitting the DCI trigger in a UE group grant. Still further, the apparatus 1102/1102' for wireless communication may include means for receiving the UCI in a PUSCH when the DCI trigger is transmitted in the UE group grant without transmitting a PUSCH grant. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), the method comprising:
monitoring one or more subframes for a downlink control information (DCI) trigger in an unlicensed frequency spectrum;
receiving the DCI trigger in a subframe when a listen-before-talk procedure is successful, the DCI trigger being associated with a plurality of UEs, the DCI trigger indicating a plurality of resources reserved for the plurality of UEs, and the DCI trigger indicating at least one resource of the plurality of resources is reserved for a transmission of uplink control information (UCI) by the UE; and
transmitting the UCI using a subsequent subframe in the unlicensed frequency spectrum when the DCI trigger indicates that the at least one resource of the plurality of resources reserved for the transmission of the UCI by the UE are located in the subsequent subframe.

2. The method of claim 1, wherein:
the DCI trigger is received in a physical uplink shared channel (PUSCH) grant;
the transmitting the UCI comprises transmitting the UCI using specific resources in a physical uplink control channel (PUCCH) in the subsequent subframe; and
the specific resources in the PUCCH are configured by radio resource control (RRC) signaling, based on a position of the PUSCH grant in the subframe, or by the DCI trigger.

3. The method of claim 1, wherein:
the DCI trigger is received in a physical uplink shared channel (PUSCH) grant; and
the transmitting the UCI comprises including the UCI in a PUSCH in the subsequent subframe.

4. The method of claim 1, wherein:
the DCI trigger is received in a physical downlink shared channel (PDSCH) grant;
the transmitting the UCI comprises transmitting the UCI using specific resources in a physical uplink control channel (PUCCH) in the subsequent subframe; and
the specific resources in the PUCCH are configured by radio resource control (RRC) signaling, based on a position of the PDSCH grant in the subframe, or by the DCI trigger.

5. The method of claim 1, further comprising:
receiving a physical uplink shared channel (PUSCH) grant;
wherein the DCI trigger is received in a physical downlink shared channel (PDSCH) grant;
wherein the transmitting the UCI comprises transmitting the UCI using specific resources in a physical uplink control channel (PUCCH) in the subsequent subframe; and
wherein the specific resources in the PUCCH are configured by radio resource control (RRC) signaling, based on a position of the PDSCH grant in the subframe, or by the DCI trigger.

6. The method of claim 1, further comprising:
receiving a physical uplink shared channel (PUSCH) grant;
wherein the DCI trigger is received in a physical downlink shared channel (PDSCH) grant; and
wherein the transmitting the UCI comprises including the UCI in a PUSCH in the subsequent subframe.

7. The method of claim 1, wherein:
the DCI trigger is received in a UE group grant that includes an index of multiple UEs in the UE group;
the transmitting the UCI comprises transmitting the UCI using specific resources in a physical uplink control channel (PUCCH) in the subsequent subframe; and
the specific resources in the PUCCH are configured by radio resource control (RRC) signaling, based on a position of the DCI trigger in the UE group grant, or by the DCI trigger.

8. The method of claim 1, wherein the DCI trigger is received in a UE group grant that includes an index of multiple UEs in the UE group, the method further comprising:
determining a number of preceding UEs in the group that also received the DCI trigger by decoding the DCI trigger; and
determining specific resources in the subsequent subframe in which to transmit the UCI based on a position in the index and the number of preceding UEs in the group that also received the DCI trigger.

9. The method of claim 1, further comprising:
receiving a physical uplink shared channel (PUSCH) grant;
wherein the DCI trigger is received in a UE group grant that includes an index of multiple UEs in the UE group; and
wherein the transmitting the UCI comprises including the UCI in a physical uplink control channel (PUCCH or a PUSCH in the subsequent subframe.

10. The method of claim 1, wherein:
the DCI trigger is received in a UE group grant that includes an index of multiple UEs in the UE group; and
the transmitting the UCI comprises including the UCI in a physical uplink shared channel (PUSCH) in the subsequent subframe without receiving a PUSCH grant.

11. A method of wireless communication of a base station, the method comprising:
- configuring one or more subframes to include a downlink control information (DCI) trigger in an unlicensed frequency spectrum;
- transmitting the DCI trigger in the one or more subframes when a listen-before-talk procedure is successful, the DCI trigger being associated with a plurality of UEs, the DCI trigger indicating a plurality of resources reserved for the plurality of UEs, and the DCI trigger indicating at least one resource of the plurality of resources is reserved for a transmission of uplink control information (UCI) by the UE; and
- receiving the UCI in a subsequent subframe in the unlicensed frequency spectrum from the UE when the DCI trigger indicates that the at least one resource of the plurality of resources reserved for the transmission of the UCI by the UE is located in the subsequent subframe.

12. The method of claim 11, wherein:
- the transmitting the DCI trigger comprises transmitting the DCI trigger in an uplink shared channel (PUSCH) grant;
- the receiving the UCI comprises receiving the UCI in specific resources in a physical uplink control channel (PUCCH) in the subsequent subframe; and
- the specific resources in the PUCCH are configured by radio resource control (RRC) signaling, based on a position of the PUSCH grant in the one or more subframes, or by the DCI trigger.

13. The method of claim 11, wherein:
- the transmitting the DCI trigger comprises transmitting the DCI trigger in an uplink shared channel (PUSCH) grant; and
- the receiving the UCI comprises receiving the UCI in a PUSCH in the subsequent subframe.

14. The method of claim 11, wherein:
- the transmitting the DCI trigger comprises transmitting the DCI trigger in a physical downlink shared channel (PDSCH) grant;
- the receiving the UCI comprises receiving the UCI in specific resources in a physical uplink control channel (PUCCH) in the subsequent subframe; and
- the specific resources in the PUCCH are configured by radio resource control (RRC) signaling, based on a position of the PDSCH grant in the one or more subframes, or by the DCI trigger.

15. The method of claim 11, further comprising:
- transmitting a physical uplink shared channel (PUSCH) grant;
- wherein the transmitting the DCI trigger comprises transmitting the DCI trigger in a physical downlink shared channel grant (PDSCH) grant;
- wherein the receiving the UCI comprises receiving the UCI in specific resources in a physical uplink control channel (PUCCH) in the subsequent subframe; and
- wherein the specific resources in the PUCCH are configured by radio resource control (RRC) signaling, based on a position of the PDSCH grant in the one or more subframes, or by the DCI trigger.

16. The method of claim 11, further comprising:
- transmitting a physical uplink shared channel (PUSCH) grant;
- wherein the transmitting the DCI trigger comprises transmitting the DCI trigger in a physical downlink shared channel grant (PDSCH) grant; and
- wherein the receiving the UCI comprises receiving the UCI in a PUSCH in the subsequent subframe.

17. The method of claim 11, wherein:
- the transmitting the DCI trigger comprises transmitting the DCI trigger in a UE group grant that includes an index of UEs in the UE group;
- the receiving the UCI comprises receiving the UCI in specific resources in a physical uplink control channel (PUCCH) in the subsequent subframe; and
- the specific resources in the PUCCH are configured by radio resource control (RRC) signaling, based on a position of the DCI trigger in the UE group grant, or by the DCI trigger.

18. The method of claim 11, wherein:
- the transmitting the DCI trigger comprises transmitting the DCI trigger in a UE group grant that includes an index of UEs in the UE group;
- the receiving the UCI comprises receiving the UCI in specific resources in the subsequent subframe; and
- the specific resources are configured by the index of UEs in the group and a number of preceding UEs in the group that also received the DCI trigger.

19. The method of claim 11, further comprising:
- transmitting a physical uplink shared channel (PUSCH) grant;
- wherein the transmitting the DCI trigger comprises transmitting the DCI trigger in a UE group grant that includes an index of UEs in the UE group; and
- wherein the receiving the UCI comprises receiving the UCI in a PUSCH in the subsequent subframe.

20. The method of claim 11, wherein:
- the transmitting the DCI trigger comprises transmitting the DCI trigger in a UE group grant that includes an index of UEs in the UE group; and
- the receiving the UCI comprises receiving the UCI in a physical uplink shared channel (PUSCH) without transmitting a PUSCH grant.

21. An apparatus for wireless communication, comprising:
- a memory; and
- at least one processor coupled to the memory and configured to:
  - monitor one or more subframes for a downlink control information (DCI) trigger in an unlicensed frequency spectrum;
  - receive the DCI trigger in a subframe when a listen-before-talk procedure is successful, the DCI trigger being associated with a plurality of UEs, the DCI trigger indicating a plurality of resources reserved for the plurality of UEs, and the DCI trigger indicating at least one resource of the plurality of resources is reserved for a transmission of uplink control information (UCI) by the UE; and
  - transmit the UCI using a subsequent subframe in the unlicensed frequency spectrum when the DCI trigger indicates that the at least one resource of the plurality of resources reserved for the transmission of the UCI by the UE are located in the subsequent subframe.

22. The apparatus of claim 21, wherein:
- the DCI trigger is received in a physical uplink shared channel (PUSCH) grant;
- the at least one processor is configured to transmit the UCI by transmitting the UCI using specific resources in a physical uplink control channel (PUCCH) in the subsequent subframe; and the specific resources in the PUCCH are configured by radio resource control (RRC) signaling, based on a position of the PUSCH grant in the subframe, or by the DCI trigger.

23. The apparatus of claim 21, wherein:
the DCI trigger is received in a physical uplink shared channel (PUSCH) grant; and
the at least one processor is configured to transmit the UCI by including the UCI in a PUSCH in the subsequent subframe.

24. The apparatus of claim 21, wherein:
the DCI trigger is received in a physical downlink shared channel (PDSCH) grant;
the at least one processor is configured to transmit the UCI by transmitting the UCI using specific resources in a physical uplink control channel (PUCCH) in the subsequent subframe; and
the specific resources in the PUCCH are configured by radio resource control (RRC) signaling, based on a position of the PDSCH grant in the subframe, or by the DCI trigger.

25. The apparatus of claim 21, wherein:
at least one processor is further configured to receive a physical uplink shared channel (PUSCH) grant;
the DCI trigger is received in a physical downlink shared channel (PDSCH) grant;
the at least one processor is configured to transmit the UCI by transmitting the UCI using specific resources in a physical uplink control channel (PUCCH) in the subsequent subframe; and
the specific resources in the PUCCH are configured by radio resource control (RRC) signaling, based on a position of the PDSCH grant in the subframe, or by the DCI trigger.

26. An apparatus for wireless communication, comprising:
a memory; and
at least one processor coupled to the memory and configured to:
configure one or more subframes to include a downlink control information (DCI) trigger in an unlicensed frequency spectrum;
transmit the DCI trigger in the one or more subframes when a listen-before-talk procedure is successful, the DCI trigger being associated with a plurality of UEs, the DCI trigger indicating a plurality of resources reserved for the plurality of UEs, and the DCI trigger indicating at least one resource of the plurality of resources is reserved for a transmission of uplink control information (UCI) by the UE; and
receive the UCI in a subsequent subframe in the unlicensed frequency spectrum from the UE when the DCI trigger indicates that the at least one resource of the plurality of resources reserved for the transmission of the UCI by the UE is located in the subsequent subframe.

27. The apparatus of claim 26, wherein:
the at least one processor is configured to transmit the DCI trigger by transmitting the DCI trigger in an uplink shared channel (PUSCH) grant;
the at least one processor is configured to receive the UCI by receiving the UCI in specific resources in a physical uplink control channel (PUCCH) in the subsequent subframe; and
the specific resources in the PUCCH are configured by radio resource control (RRC) signaling, based on a position of the PUSCH grant in the one or more subframes, or by the DCI trigger.

28. The apparatus of claim 26, wherein:
the at least one processor is configured to transmit the DCI trigger by transmitting the DCI trigger in an uplink shared channel (PUSCH) grant; and
the at least one processor is configured to receive the UCI by receiving the UCI in a PUSCH in the subsequent subframe.

29. The apparatus of claim 26, wherein:
the at least one processor is configured to transmit the DCI trigger by transmitting the DCI trigger in a physical downlink shared channel (PDSCH) grant;
the at least one processor is configured to receive the UCI by receiving the UCI in specific resources in a physical uplink control channel (PUCCH) in the subsequent subframe; and
the specific resources in the PUCCH are configured by radio resource control (RRC) signaling, based on a position of the PDSCH grant in the one or more subframes, or by the DCI trigger.

30. The apparatus of claim 26, wherein:
the at least one processor is further configured to transmit a physical uplink shared channel (PUSCH) grant;
the at least one processor is configured to transmit the DCI trigger by transmitting the DCI trigger in a physical downlink shared channel grant (PDSCH) grant;
the at least one processor is configured to receive the UCI by receiving the UCI in specific resources in a physical uplink control channel (PUCCH) in the subsequent subframe; and
the specific resources in the PUCCH are configured by radio resource control (RRC) signaling, based on a position of the PDSCH grant in the one or more subframes, or by the DCI trigger.

* * * * *